United States Patent
Okazaki

(10) Patent No.: US 11,231,926 B2
(45) Date of Patent: Jan. 25, 2022

(54) ARITHMETIC PROCESSING UNIT AND CONTROL METHOD FOR ARITHMETIC PROCESSING UNIT

(71) Applicant: FUJITSU LIMITED, Kawasaki (JP)

(72) Inventor: Ryohei Okazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/114,549

(22) Filed: Dec. 8, 2020

(65) Prior Publication Data

US 2021/0089302 A1    Mar. 25, 2021

Related U.S. Application Data

(62) Division of application No. 16/361,281, filed on Mar. 22, 2019, now Pat. No. 10,983,790.

(30) Foreign Application Priority Data

Apr. 17, 2018   (JP) .............................. JP2018-079011

(51) Int. Cl.
*G06F 9/30* (2018.01)
*G06F 9/38* (2018.01)

(52) U.S. Cl.
CPC ........ *G06F 9/3001* (2013.01); *G06F 9/30145* (2013.01); *G06F 9/3822* (2013.01); *G06F 9/3863* (2013.01); *G06F 9/3889* (2013.01)

(58) Field of Classification Search
CPC .. G06F 9/30145; G06F 9/3889; G06F 9/3001; G06F 9/3863; G06F 9/3822
USPC ....................................................... 712/205
See application file for complete search history.

(56) References Cited

U.S. PATENT DOCUMENTS

| | | | | |
|---|---|---|---|---|
| 6,260,138 | B1* | 7/2001 | Harris | G06F 9/3844 711/210 |
| 7,958,338 | B2* | 6/2011 | Akizuki | G06F 9/30141 712/217 |
| 2002/0019927 | A1 | 2/2002 | Hondou | |
| 2002/0038417 | A1* | 3/2002 | Strombergsson | G06F 9/30079 712/239 |

(Continued)

FOREIGN PATENT DOCUMENTS

| | | |
|---|---|---|
| JP | 2002-055814 A | 2/2002 |
| JP | 2004-030424 A | 1/2004 |
| JP | 2010-257199 A | 11/2010 |

OTHER PUBLICATIONS

USPTO, (Lee) Restriction Requirement, dated Oct. 23, 2020, in parent U.S. Appl. No. 16/361,281 [pending].

*Primary Examiner* — Chun Kuan Lee
(74) *Attorney, Agent, or Firm* — Fujitsu Patent Center

(57) ABSTRACT

An arithmetic processing unit includes an instruction decoder, first to fourth reservation stations, first and second computing units, first and second load-store units, and an allocation unit. The allocation unit, when the execution instruction is a first instruction that is executable in first and second computing units but not executable in first and second load-store units, allocates the first instruction to first or second reservation station based on a first allocation table, and when the execution instruction is a second instruction that is executable in the first and second load-store units but not executable in the first and second computing units, allocates the second instruction to third or fourth reservation station based on a second allocation table.

3 Claims, 22 Drawing Sheets

(56) References Cited

U.S. PATENT DOCUMENTS

2004/0003205 A1   1/2004   Akiu et al.
2010/0274995 A1   10/2010  Matsuyama
2018/0004528 A1*  1/2018   Okazaki .................. G06F 9/261

* cited by examiner

FIG.7

|    | RSE_table_1 | RSA_table_1 | RSE_table_2 | RSA_table_2 |
|----|-------------|-------------|-------------|-------------|
| D0 | RSEm        | RSAm        | RSEm        | RSAm        |
| D1 | RSEf        | RSAf        | RSEm        | RSAm        |
| D2 | RSEm        | RSAm        | RSEm        | RSAm        |
| D3 | RSEf        | RSAf        | RSEm        | RSAm        |

|    | RSX_table_1 | RSX_table_2 | RSX_table_3 | RSX_table_4 | RSX_table_5 | RSX_table_6 |
|----|-------------|-------------|-------------|-------------|-------------|-------------|
| D0 | RSEm        | RSAm        | RSEm        | RSAm        | RSEm        | RSAm        |
| D1 | RSEf        | RSAf        | RSEf        | RSAf        | RSEm        | RSAm        |
| D2 | RSAm        | RSEm        | RSEm        | RSAm        | RSEm        | RSAm        |
| D3 | RSAf        | RSEf        | RSEf        | RSAf        | RSEm        | RSAm        |

FIG.8

|    | RSE_table_1 | RSA_table_1 | RSE_table_2 | RSA_table_2 |
|----|-------------|-------------|-------------|-------------|
| D0 | RSEm        | RSAm        | RSEm        | RSAm        |
| D1 | RSEm        | RSAm        | RSEm        | RSAm        |
| D2 | RSEf        | RSAf        | RSEm        | RSAm        |
| D3 | RSEf        | RSAf        | RSEm        | RSAm        |

|    | RSX_table_1 | RSX_table_2 | RSX_table_3 | RSX_table_4 | RSX_table_5 | RSX_table_6 |
|----|-------------|-------------|-------------|-------------|-------------|-------------|
| D0 | RSEm        | RSAm        | RSEm        | RSAm        | RSEm        | RSAm        |
| D1 | RSAm        | RSEm        | RSEm        | RSAm        | RSEm        | RSAm        |
| D2 | RSEf        | RSAf        | RSEf        | RSAf        | RSEm        | RSAm        |
| D3 | RSAf        | RSEf        | RSEf        | RSAf        | RSEm        | RSAm        |

FIG.10

| RSE_table_1 | |
|---|---|
| D0 | RSEm |
| D1 | RSEf |
| D2 | RSEm |
| D3 | RSEf |

| RSX_table_1 | |
|---|---|
| D0 | RSEm |
| D1 | RSEf |
| D2 | RSAm |
| D3 | RSAf |

RSEm x 2
RSEf x 1
ESAf x 1

T1

| | INSTRUCTION TYPE | REFERENCE table | ALLOCATION DESTINATION RS |
|---|---|---|---|
| D0 | RSE | RSE_table_1 | RSEm |
| D1 | RSX | RSX_table_1 | RSEf |
| D2 | RSE | RSE_table_1 | RSEm |
| D3 | RSX | RSX_table_1 | RSAf |

FIG.11

| | RSE_table_1 |
|---|---|
| D0 | RSEm |
| D1 | RSEf |
| D2 | RSEm |
| D3 | RSEf |

| | RSX_table_1 |
|---|---|
| D0 | RSAm |
| D1 | RSEm |
| D2 | RSAf |
| D3 | RSEf |

RSEm x 3
RSEf x 1

T2

| INSTRUCTION TYPE | REFERENCE table | ALLOCATION DESTINATION RS |
|---|---|---|
| D0 | RSE | RSE_table_1 | RSEm |
| D1 | RSX | RSX_table_1 | RSEm |
| D2 | RSE | RSE_table_1 | RSEm |
| D3 | RSX | RSX_table_1 | RSEf |

FIG.20

| INSTRUCTION NUMBER | INSTRUCTIONS IN LOOP CACHE | SLAVE_FLG | Chain ID | CHAIN TABLE ID RSE0/RSE1/RSA |
|---|---|---|---|---|
| 0 | | | | |
| 1 | ADD(RSX) | | 0 | 100 (ALLOCATE INSTRUCTIONS 1 TO 4 TO RSE0) |
| 2 | DIV(RSE0) | 1 | 0 | |
| 3 | ADD(RSX) | 1 | 0 | |
| 4 | ADD(RSX) | 1 | 0 | |
| 5 | | | | |
| 6 | | | | |
| 7 | ADD(RSX) | | 1 | 001 (ALLOCATE INSTRUCTIONS 7 TO 12 TO RSA) |
| 8 | ADD(RSX) | 1 | 1 | |
| 9 | ADD(RSX) | 1 | 1 | |
| 10 | LOAD(RSA) | 1 | 1 | |
| 11 | ADD(RSX) | 1 | 1 | |
| 12 | ADD(RSX) | 1 | 1 | |
| 13 | | | | |
| 14 | | | | |
| 15 | | | | |

FIG.21

| RSE0 | RSE1 | RSA | ALLOCATION DESTINATION |
|---|---|---|---|
| 0 | 0 | 0 | DETERMINE ALLOCATION DESTINATIONS SEQUENTIALLY TO RSA0, RSA1, RSE0 AND RSE1 FOR EACH CHAIN ID. |
| 0 | 0 | 1 | DETERMINE ALLOCATION DESTINATIONS SEQUENTIALLY TO RSA0 AND RSA1 FOR EACH CHAIN ID. |
| 0 | 1 | 0 | RSE1 |
| 0 | 1 | 1 | RSE1 (PROVIDED THAT RSA INSTRUCTION IS ALLOCATED TO RSA.) |
| 1 | 0 | 0 | RSE0 |
| 1 | 0 | 1 | RSE0 (PROVIDED THAT RSA INSTRUCTION IS ALLOCATED TO RSA.) |
| 1 | 1 | 0 | DETERMINE ALLOCATION DESTINATIONS SEQUENTIALLY TO RSE0 AND RSE1 FOR EACH CHAIN ID. (PROVIDED THAT RSE0 AND RSE1 INSTRUCTIONS ARE ALLOCATED TO RSE0 AND RSE1 RESPECTIVELY.) |
| 1 | 1 | 1 | DETERMINE ALLOCATION DESTINATIONS SEQUENTIALLY TO RSE0 AND RSE1 FOR EACH CHAIN ID. (PROVIDED THAT RSE0 AND RSE1 INSTRUCTIONS ARE ALLOCATED TO RSE0 AND RSE1 RESPECTIVELY. RSA INSTRUCTION IS ALLOCATED TO RSA.) |

FIG.22

| INSTRUCTION IN CHAIN INSTRUCTION STRING | | | INSTRUCTION IN CHAIN TABLE | |
|---|---|---|---|---|
| RSE | RSE0 | RSE1 | RSE0 | RSE1 |
| 0 | 0 | 0 | 0 | 0 |
| 0 | 0 | 1 | 0 | 1 |
| 0 | 1 | 0 | 1 | 0 |
| 0 | 1 | 1 | 1 | 1 |
| 1 | 0 | 0 | 1 | 1 |
| 1 | 0 | 1 | 0 | 1 |
| 1 | 1 | 0 | 1 | 0 |
| 1 | 1 | 1 | 1 | 1 |

ARITHMETIC PROCESSING UNIT AND CONTROL METHOD FOR ARITHMETIC PROCESSING UNIT

CROSS-REFERENCE TO RELATED APPLICATION

This application is a divisional of application Ser. No. 16/361,281, filed Mar. 22, 2019, which is based upon and claims the benefit of priority of the prior Japanese Patent Application No. 2018-079011, filed on Apr. 17, 2018, the entire contents of which are incorporated herein by reference.

FIELD

The present invention relates to an arithmetic processing unit and a control method for the arithmetic processing unit.

BACKGROUND

An arithmetic processing unit is a processor or central processing unit (CPU). The processor includes an instruction cache that registers an instruction fetched from a main memory (hereinafter, referred to as "fetch instruction"), and an instruction buffer that temporarily stores a fetch instruction fetched from the instruction cache. Further, the processor includes an instruction decoder that decodes instructions in the instruction buffer in the sequence of the program (in-order-execution), and a reservation station that stores a decoded instruction (hereinafter, referred to as "execution instruction") to an instruction queue thereof. The execution instruction queued in the reservation station is executed by a computing unit in random order (out-of-order execution) when execution of the instruction is ready. The instruction buffer and the instruction decoder are in a pipeline configuration, whereby the instructions are sequentially processed synchronizing with the clock of the processor.

A superscalar processor includes a plurality of the above computing units, so that the plurality of computing units executes a plurality of decoded instructions (execution instructions) in parallel.

The above processor is disclosed in Japanese Laid-open Patent Publication Nos. 2002-55814, 2004-30424, and 2010-257199, for example.

SUMMARY

In order to increase throughput of the decoding processing, the instruction decoder includes a plurality of slots and decodes a plurality of fetch instructions in parallel using the plurality of slots. Then the instruction decoder queues the plurality of decoded execution instructions to the reservation station in parallel. Since the instruction decoder is a key processing unit to control the operation of the entire pipeline in the processor, throughput of the pipeline can be improved by processing the plurality of fetch instructions in parallel using the plurality of slots of the instruction decoder, as mentioned above.

Meanwhile, the number of input ports of the reservation station may be limited in order to conserve power consumption of the processor. In this case, the number of input ports (L) of the reservation station may be less than the number of slots (K) of the instruction decoder. Thus, it is difficult to queue the K number of instructions, which has been generated in the instruction decoder in parallel, to one reservation station in one cycle. As a result, the instruction decoder queues the K number of decoded instructions to one reservation station in a plurality of cycles, which drops the throughput of the instruction decoder.

A superscalar processor includes a plurality of computing units and processes a plurality of instructions in parallel. In order to increase the operation frequency of the processor, a dedicated reservation station is disposed in each of the plurality of computing units. In this case, an execution instruction queued in a reservation station is executed by a corresponding computing unit, but not by the other computing units. Therefore, when many execution instructions are allocated to one reservation station, processing of the execution instructions is concentrated to the corresponding computing unit, which drops the throughput of the plurality of computing units.

According to the embodiment, an arithmetic processing unit comprising: an instruction decoder that includes a plural K number of decoder slots, each of the decoder slots decoding a fetch instruction that is fetched in an in-order execution according to a program and generating an execution instruction; first to fourth reservation stations, each of the reservation stations including a plural L number that is smaller than the K number of input ports and an instruction queue that queues the execution instructions via the input ports; first and second computing units, the first and second computing units exclusively including the first and second reservation stations, respectively, and exclusively executing the execution instructions queued in the first and second reservation stations, respectively; first and second load-store units, the first and second load-store units exclusively including the third and fourth reservation stations, respectively, and exclusively executing the execution instructions queued in the third and fourth reservation stations, respectively; and an allocation unit configured to allocate the K number of execution instructions that are generated by the K number of corresponding decoder slots of the instruction decoder to one of the first to fourth reservation stations, respectively.

And, in the allocation unit, (1) when the execution instruction is a first instruction that is executable in the first and second computing units but not executable in the first and second load-store units, the allocation unit allocates the first instruction to the first or second reservation station based on a first allocation table;

(2) when the execution instruction is a second instruction that is executable in the first and second load-store units but not executable in the first and second computing units, the allocation unit allocates the second instruction to the third or fourth reservation station based on a second allocation table; and (3) when the execution instruction is a third instruction that is executable in the first and second load-store units and the first and second computing units, the allocation unit allocates the third instruction to one of the first to fourth reservation stations based on a third allocation table.

The first, second, and third allocation tables include the K number of allocation destination reservation stations each corresponding to the K number of respective decoder slots, the first allocation table has the K number of the allocation destination reservation stations constituted of a number equal to or lower than the L of the first reservation stations and a number equal to or lower than the L of the second reservation stations arranged in a first sequence which is determined depending on whether a number of vacancies in an instruction queue of the first or second reservation station is more or fewer, the second allocation table has the K number of destination reservation stations constituted of a number equal to or lower than the L of the third reservation stations and a number equal to or lower than the L of fourth reservation stations, which are arranged in the first sequence, the third allocation table has the K number of allocation destination reservation stations, where the allocation destination reservation stations of the first plurality of decoder slots are the allocation destination reservation stations of the first plurality of decoder slots in the first allocation table, and the allocation destination reservation stations of a second plurality of decoder slots, which are different from the first plurality of decoder slots, are the allocation destination reservation stations of the second plurality of decoder slots in the second allocation table, and the allocation destination reservation stations are arranged in the first sequence.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a first example of allocation tables.

FIG. 8 is a second example of allocation tables.

FIG. 10 is an example of the allocating instructions in each slot D0 to D3 using the allocation tables.

FIG. 11 is a comparative example of allocating instructions in each slot D0 to D3 using an unpreferred allocation table.

FIG. 20 is a table indicating the chain IDs and the chain table IDs corresponding to examples of the instruction strings registered in the loop cache.

FIG. 21 is an example of a chain table.

FIG. 22 is a table indicating the correspondence between the presence of the RSE instruction, the RSE0 instruction, and the RSE1 instruction in the chain instruction string; and the fields of RSE0 and RSE1 among the three bits of RSE0, RSE1 and RSA of the ID in the chain table in FIG. 21.

DESCRIPTION OF EMBODIMENTS

Figure 1:
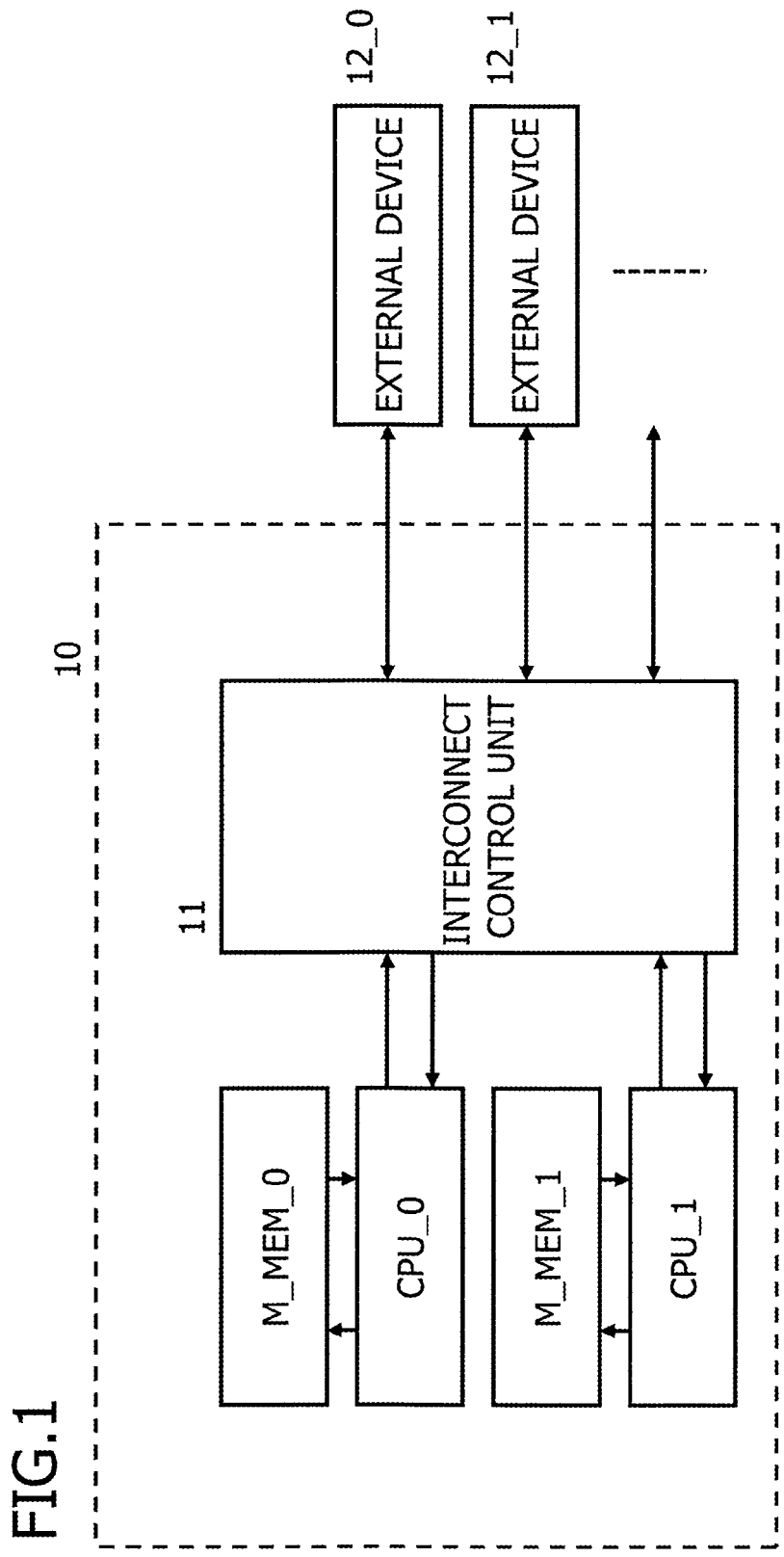
FIG. 1 is a diagram depicting a configuration example of an information processing apparatus according to this embodiment.

FIG. 1 is a diagram depicting a configuration example of an information processing apparatus according to this embodiment. The information processing apparatus 10 is a computer, such as a high performance computer (HPC) or a server, for example. The information processing apparatus includes a plurality of arithmetic processing units (processors or CPUs) CPU_0 and CPU_1, a plurality of main memories MEM_0 and MEM_1, and an interconnect control unit 11. The arithmetic processing unit can access the corresponding memory. Further, the plurality of arithmetic processing units CPU_0 and CPU_1 are connected to a plurality of external devices 12_0 and 12_1 (e.g. storages) and a network (not illustrated) via the interconnect control unit (chip) 11. The interconnect control unit 11 performs input/output control for the external devices and the network.

Embodiment 1

Configuration Example of Processor

Figure 2:
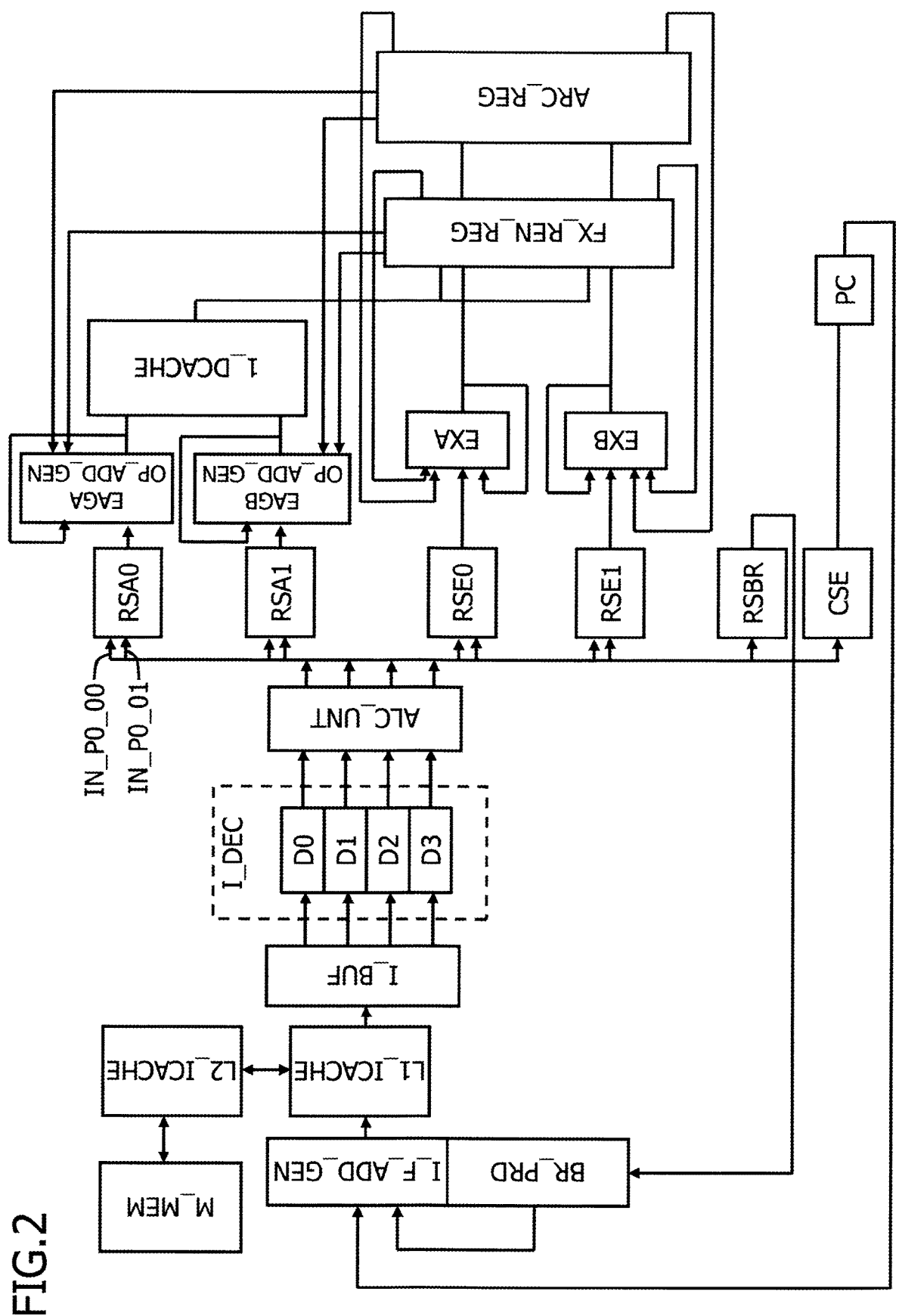
FIG. 2 is a diagram depicting a configuration example according to Embodiment 1.

FIG. 2 is a diagram depicting a configuration example of a processor according to Embodiment 1. The processor depicted in FIG. 2 includes, as computing units, operand address generators OP_ADD_GEN (EAGA and EAGB) which operate as load/store units, and fixed-point computing units EXA and EXB. The operand address generator includes an addition/subtraction circuit that calculates an address, a primary data cache memory L1_DCACHE that stores data, and an access control unit that controls access to the main memory when a cache miss is generated. This means that the operand address generator is also a type of computing unit.

The fixed-point computing unit includes an addition/subtraction circuit, a logic computing unit, a multiplier, a divider and the like. The processor may include a floating-point computing unit in addition to the fixed-point computing unit. In FIG. 2, however, the floating-point computing unit is not shown. In the description of the following embodiments, the floating-point computing unit is omitted for simplification.

In the example in FIG. 2, the two operand address generators OP_ADD_GEN and the two fixed-point computing units EXA and EXB are disposed, although these numbers are merely examples. The number of operand address generators and the number of fixed-point computing units may be determined in accordance with the number of slots in the instruction decoder I_DEC.

The general configuration of the processor will be described according to the processing flow. First a fetch address is generated by the instruction fetch address generator I_F_ADD_GEN, and fetch instructions, fetched from the primary instruction cache L1_ICACHE, are temporarily stored in the instruction buffer I_BUF in the execution sequence of the program (by in-order execution). Then the instruction decoder I_DEC inputs and decodes the fetch instructions in the instruction buffer by in-order execution and generates execution instructions in which information to be used for execution is added.

The execution instructions generated by the instruction decoder are queued and stored in a storage having a queue structure (such a storage is known as a reservation station) by in-order execution by an allocation unit ALC_UNT. The reservation station is disposed for each of the computing units and circuits which execute instructions, and includes, for example, two reservation stations for address generation (RSAs) corresponding to the operand address generators EAGA and EAGB, two reservation stations for execution (RSEs) corresponding to the fixed-point computing units EXA and EXB, and a reservation station for branch (RSBR) corresponding to a branch prediction unit BR_PRD. In a case where the processor includes a plurality of floating-point computing units, the processor includes a corresponding number of reservation stations as well.

The reservation station may be referred to as "RS" herein below.

The execution instructions queued in each reservation station are executed by a corresponding computing unit or the like in random order (out-of-order execution) from the instruction for which instruction execution conditions are ready. These conditions are, for example, whether an input operand to be used for executing the instruction can be read from the register file after the computing processing of the previous instruction is completed (whether a read-after-write restriction is satisfied), and whether the computing unit is available.

The execution instruction decoded and generated by the instruction decoder receives an instruction identifier (IID) according to the execution sequence in the program and is sent to a commit stack entry (CSE) by in-order execution by the allocation unit ALC_UNT. CSE includes a storage having a queue structure which stores the allocated execution instructions by in-order execution, and an instruction commit processing unit which performs a commit processing (completion processing) of the operation based on the information in the queue, responding to the instruction processing completion report sent from the computing unit.

The allocated execution instruction is stored in the queue in CSE by in-order execution and waits for the instruction processing completion report. Then, as mentioned above, the execution instruction is sent to the computer unit by out-of-order execution from each reservation station and is executed by the computing unit. Then when the instruction processing completion report is sent to CSE, the instruction commit processing unit of CSE, by in-order execution, performs completion processing of the execution instruction corresponding to the processing completion report out of the instructions stored in the queue waiting for the processing completion report, and updates the circuit resources, such as a register.

The processor also includes an architecture register file (or a general-purpose register file) ARC_REG which is accessible by software, and a renaming register file REN-REG which temporarily stores the computing result from the computing unit. Each register file includes a plurality of registers. In order to execute the execution instructions by out-of-order execution, the renaming register file temporarily stores the computing result, and in the computing completion processing, the computing result stored in the renaming register is stored in the register in the architecture register file, so that the register in the renaming register file is open. CSE also increments a program counter PC in the completion processing.

The branch prediction unit BR_PRD predicts the branching of a branch instruction, which is queued in the RSBR for branch processing, and the instruction fetch address generator I_F_ADD_GEN generates a branching destination address based on the prediction result.

The processor also includes a secondary instruction cache L2_CACHE, and the secondary instruction cache accesses the main memory M_MEM via a memory access controller (not illustrated).

The instruction decoder I_DEC receives input of four (as the number K) fetch instructions fetched by in-order execution, in parallel, and decodes and allocates the four execution instructions to the RSs of the computing units, which are available for executing the execution instructions, in parallel via the allocation unit ALC_UNT. By constructing the instruction decoder to have a plurality of slots D0 to D3 like this, throughput of decoding the fetch instructions is improved.

Configuration Example of Instruction Decoder

Figure 3:
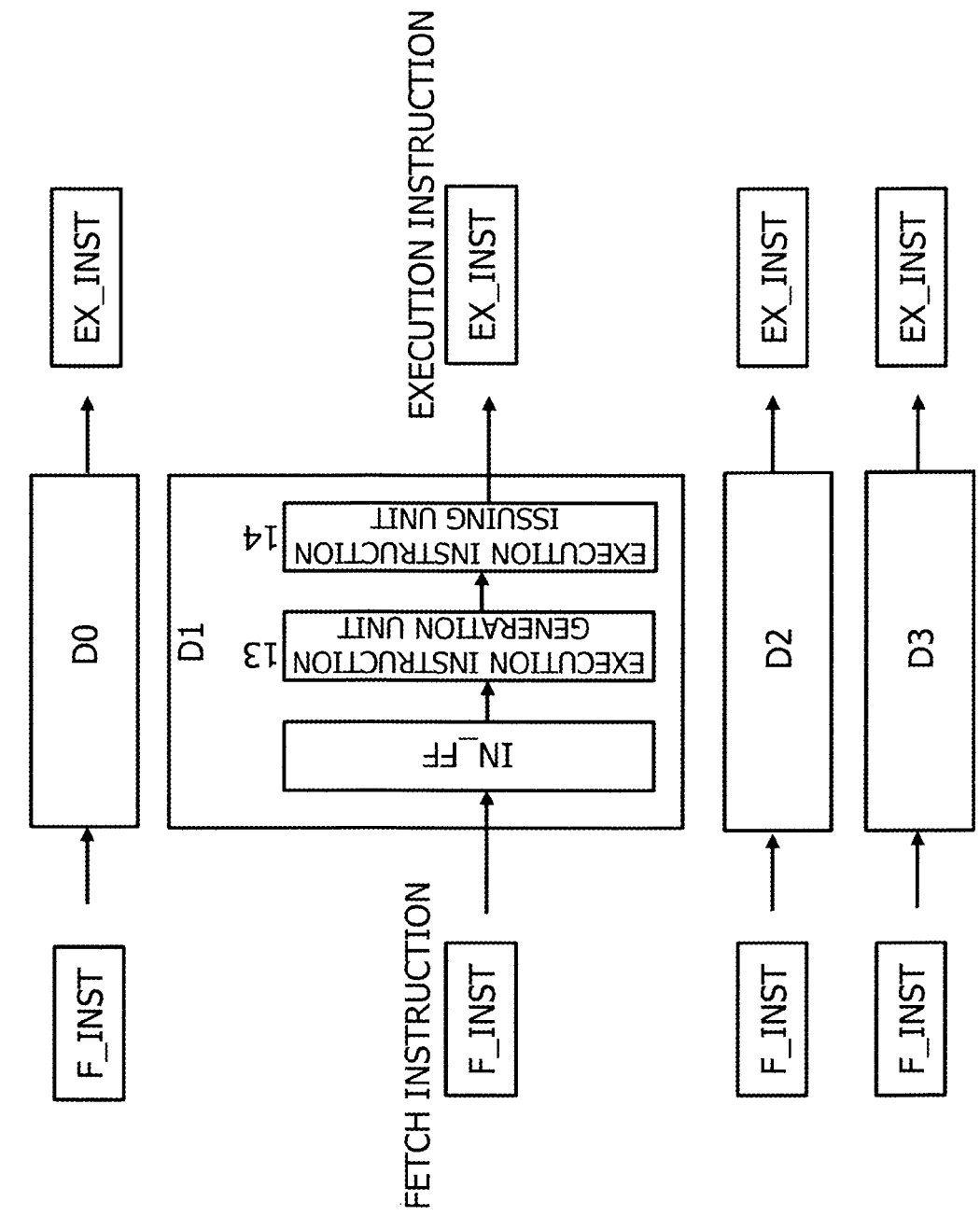
FIG. 3 is a diagram depicting an example of the instruction decoder according to Embodiment 1.

FIG. 3 is a diagram depicting an example of the instruction decoder according to Embodiment 1. The instruction decoder I_DEC includes four decoder slots D0 to D3. Each of the decoder slots D0 to D3 includes an input buffer that latches an inputted fetch instruction F_INST, an execution instruction generation unit 13 that decodes a fetch instruction and generates an execution instruction, and an execution instruction issuing unit 14 that issues an execution instruction EX_INST. The execution instruction is an instruction which includes a decoding result to execute an operation code of the fetched instruction. For example, the execution instruction includes information that is used for computing, such as which reservation station is used, which computing unit is used, and which data is used for the operand. The execution instruction generation unit 13 decodes the fetched instruction operation code and acquires information to be used for executing the computing and generates the execution instruction.

As illustrated in FIG. 3, the slots D0 to D3 of the instruction decoder receives input of the four fetch instructions F_INST respectively in parallel, and as a rule outputs the four execution instructions EX_INST in parallel. By repeating this parallel processing, throughput of the instruction decoder improves.

In the superscalar processors depicted in FIG. 2 and FIG. 3, the configuration is optimized so as to conserve power consumption and increase clock frequency. Three improvement examples thereof (1), (2) and (3) will be described.

(1) A method of conserving power consumption is to limit the number of input ports for execution instructions in the reservation stations RSA and RSE to two (L), which is less than the number of slots four (K) of the instruction decoder I_DEC. In FIG. 2, the number of input ports IN_PO_00, IN_PO_01 of each reservation station RSA0, RSA1, RSE0, and RSE1 is two. As a result, the allocation unit ALC_UNT divides the four execution instructions, which are outputted by the instruction decoder I_DEC in parallel, into two, and allocates two execution instructions to two reservation stations RSE0 and RSE1 respectively in parallel. Or the allocation unit ALC_UNT divides the four execution instructions, which are outputted by the instruction decoder I_DEC in parallel, into two, and allocates the two execution instructions to the two reservation stations RSA0 and RSA1 respectively in parallel. Further, the allocation unit ALC_UNT may allocate each of the four execution instructions, which are outputted by the instruction decoder I_DEC in parallel, into the four reservation stations RSA0, RSA1, RSE0, and RSE1 respectively in parallel.

By limiting the number of input ports of the reservation station to a number that is less than the number of slots of the instruction decoder like this, the power consumption, due to operation of the reservation station, can be conserved. However, a drop-in throughput of the four slots D0 to D3 of the instruction decoder I_DEC needs to be prevented.

(2) A method of increasing clock frequency of the pipeline circuit of the reservation station is to dispose a dedicated reservation station in each computing unit respectively.

In other words, as illustrated in FIG. 2, the two reservation stations RSE0 and RSE1 are disposed for the two fixed-point computing units EXA and EXB, and RSE0 issues an instruction to the computing unit EXA but not to the computing unit EXB, whereas RSE1 issues an instruction to the computing unit EXB but not to the computing unit EXA. By this configuration, the circuit resources that can be used by out-of-order execution, for the instructions which are stored and waiting for execution in each queue of RSE0 and RSE1, are increased.

Further, the number of logic stages to select an instruction, which is issued to the corresponding computing unit, out of a plurality of instructions waiting for execution in each queue of RSE0 and RSE1, can be decreased. This is because the number of instructions in each RS that can be issued to one computing unit is decreased by the dedicated use of each RS for the corresponding computing unit, therefore the number of logical stages, which select an instruction to be issued to the computing unit from a smaller number of instructions, is decreased. As a result, the number of stages in the pipeline circuit of the reservation station can be decreased, which decreases the processing time of one clock cycle and increases the clock frequency.

The relationship between the operand address generators EAGA and EAGB and the reservation stations RSA0 and RSA1 is the same as the relationship between the fixed-point computing units EXA and EXB and the reservation stations RSE0 and RSE1.

(3) Another method of increasing the clock frequency of the computing unit is to feedback a back-to-back path of the computing unit to this own computing unit or RS. The back-to-back path refers to, for example, a path to supply the computing result of the computing unit to the input operand of the next computing, or a path to detect an execution instruction, which can be issued in the next computing based on the previous computing result, from each reservation station. In each computing unit, the computing result thereof is fed back to this own computing unit or RS using this back-to-back path and is not fed back to the other computing unit or other RSs, whereby the computing result of this computing unit is fed back only to the input operand of this own computing unit. Further, the number of execution instructions waiting in the RS, which are searched to feedback to the reservation station, can be decreased. This decreases the clock cycle time and increases the clock frequency.

Configuration Example of Reservation Station and Computing Unit

Figure 4:
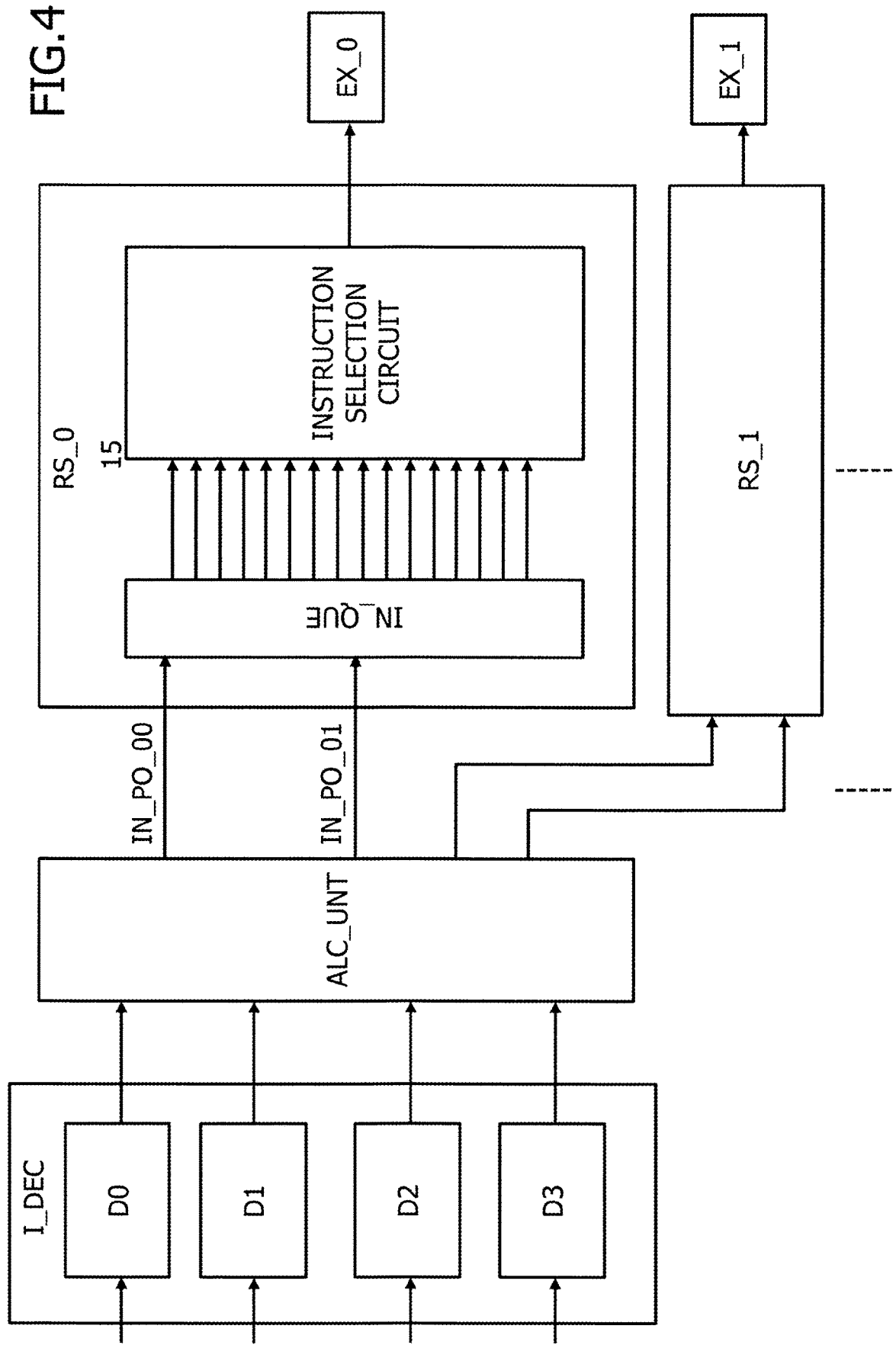
FIG. 4 is a diagram depicting a configuration example when the number of input ports of the reservation station is limited.

FIG. 4 is a diagram depicting a configuration example when the number of input ports of the reservation station is limited. The above improvement example (1) will be described with reference to FIG. 4.

FIG. 4 is a diagram depicting a configuration example of an instruction decoder I_DEC that includes four decoder slots D0 to D3, an allocation unit ALC_UNT that allocates execution instructions to the reservation stations RS_0, RS_1 of the computing units EX_0, EX_1, and a reservation station RS_0.

The reservation station RS_0 includes two input ports IN_P0_00 and IN_P0_01, an input queue IN_QUE that queues and stores execution instructions inputted from each input port, and an instruction selection circuit 15 that selects an instruction to be issued to the computing unit EX_0, out of the instructions waiting in the input queue IN_QUE. The execution instruction inputted from the input port IN_P0_00 is queued at the lowest number that is open in the input queue IN_QUE that is searched from No. 0, and the execution instruction inputted from the input port IN_P0_01 is queued at the second lowest number that is open in the input queue IN_QUE that is searched from No. 0. Each input queue can store eight execution instructions, for example.

Then the instruction selection circuit 15 selects an instruction that is in an executable state from instructions queued in the input queue IN_QUE, and issues this instruction to the computing unit EX_0 corresponding to RS_0. As mentioned above, instructions in RS are issued by out-of-order execution. The reservation station RS_1 has the same configuration and operation as RS_0.

As mentioned above, the number of input ports in the reservation stations RS_0 is limited to two, which is less than the number of slots four of the instruction decoder I_DEC, so as to decrease the number of instructions waiting in the RS, whereby power consumption is conserved, and clock frequency is increased.

Figure 5:
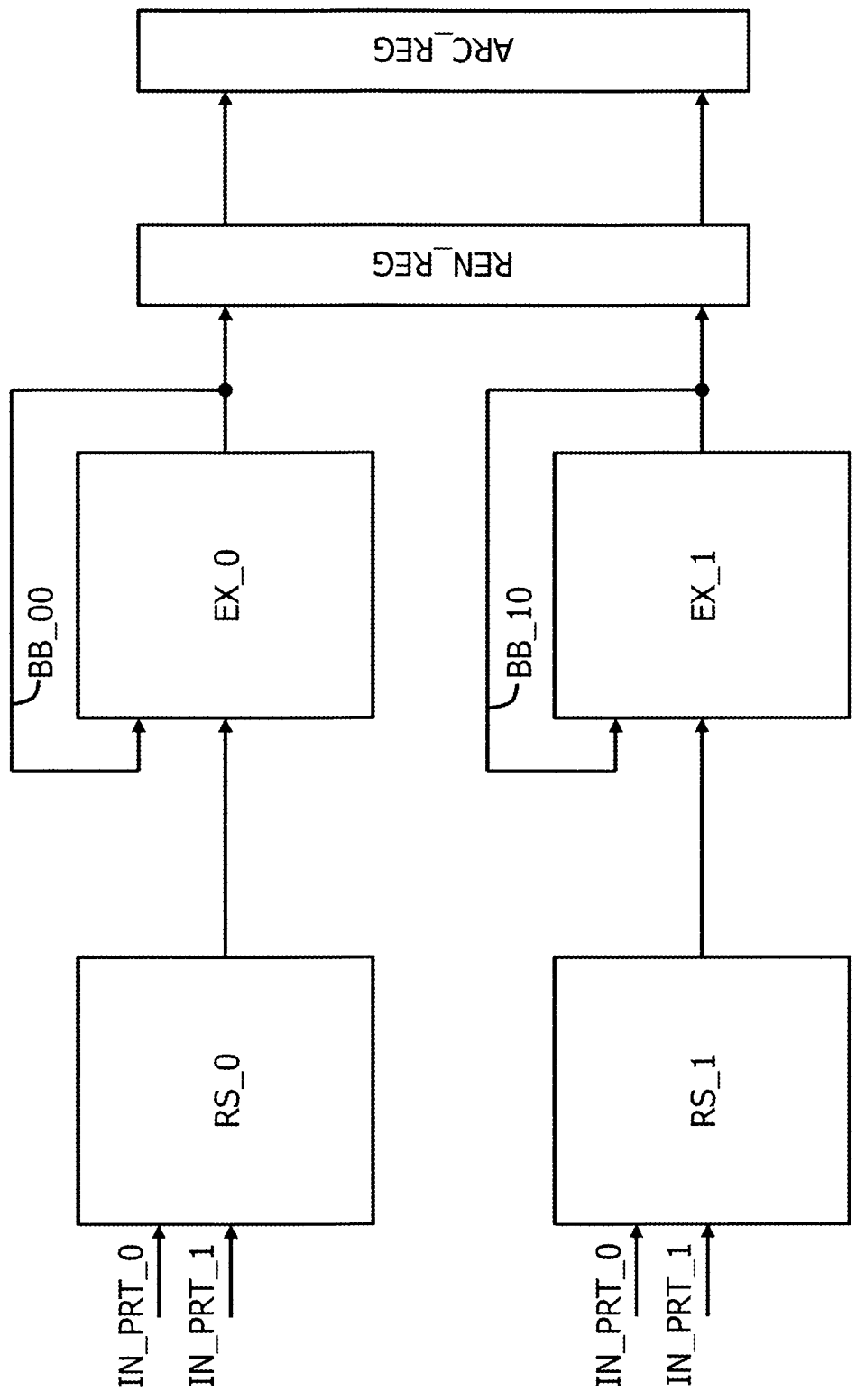
FIG. 5 is a diagram depicting an example of the back-to-back paths of the computing units, where a dedicated reservation is disposed for each computing unit.

FIG. 5 is a diagram depicting an example of the back-to-back paths of the computing units, where a dedicated reservation station is disposed for each computing unit. The above improvement examples (2) and (3) will be described with reference to FIG. 5.

In FIG. 5, the reservation stations RS_0 and RS_1, the computing units EX_0 and EX_1 which correspond to RS_0 and RS_1 respectively, the renaming register file REN_REG, and the architecture register file ARC_REG are illustrated. Connection of the renaming register file and the architecture register file to each computing unit is omitted.

A first aspect in FIG. 5 illustrates that the dedicated reservation stations RS_0 and RS_1 are disposed in the two computing units EX_0 and EX_1, respectively. An instruction queued in the reservation station RS_0 is issued to the computing unit EX_0 but is not issued to the computing unit EX_1. In other words, an instruction in the other reservation station RS_1 does not use the circuit resources of the computing unit EX_0. Thereby a plurality of execution instructions queued in the reservation station RS_0 use the circuit resources of the computing unit EX_0 exclusively. This allows the instruction selection circuit in the reservation station RS _0 to select an instruction to be issued to the computing unit EX_0, out of a small number of instructions waiting in the input queue.

A second aspect is that the computing unit EX_0 receives an execution instruction issued from the reservation station RS_0. In addition to the operation code, the execution instruction includes information to be used to execute the instruction, such as a register number which corresponds to the input operand, and a register number to store the computing result, for example. The computing unit EX_0 sets a value of the register, which corresponds to the register number, in the architecture register file, in the input operand, executes the computing corresponding to the operation code, and temporarily stores the computing result in the register in the renaming register file. Then in the instruction completion processing, the computing result in the renaming register is stored in the architecture register. The architecture register is accessible via software, and hereafter the computing of the next instruction is executed by supplying the value in the architecture register to the input operand.

The computing unit EX_0 includes a back-to-back path BB_00, which directly sends the computing result to the own input operand while bypassing (without going through) the renaming register and the architecture register. Use of this kind of path shortens the execution cycle in the following program.

| |
|---|
| Add x0, x0, x0 |
| Add x0, x0, x0 |
| Add x0, x0, x0 |
| Add x0, x0, x0 |

In this program, an addition instruction Add, to add the value of the register x0 to the value of the register x0 in the architecture register and write the result to the register x0, continues four times. In other words, the four addition instructions have a dependency such that the addition result of the previous addition instruction is used for input of the next addition instruction. Therefore, when the addition result of the previous addition instruction is supplied to the input operand of the computing unit EX_0 via the above path BB_00 without going through the renaming register and the architecture register, the execution cycle of each addition instruction is shortened.

In the case of applying the above improvements (1), (2), and (3) to the processor, it is preferable that the allocation unit ALC_UNT allocates the execution instructions generated by the four slots D0 to D3 of the instruction decoder I_DEC to each reservation station RS paying attention to the following aspects.

In the case of applying the improvement (1) to the processor, when the allocation unit allocates the number of execution instructions exceeding the number of input ports of each reservation station, the instruction decoder I_DEC is disabled to output the four executing instructions, which are generated by the instruction decoder I_DEC in parallel, in one cycle. In this case, the instruction decoder is forced to wait for the execution of the decoding processing of the next fetch instructions, until all execution instructions are allocated to the reservation stations, and this drops throughput of the instruction decoder.

In the case of applying the improvement (2) to the processor, when the allocation unit allocates the execution instructions primarily to a certain reservation station, the instructions are concentratedly issued to a specific computing unit out of the plurality of computing units and are issued less to the other computer units. This concentration of instructions to a specific computing unit drops throughput of the plurality of computing units.

In the case of applying the improvement (3) to the processor, when a string of continuous instructions having computing dependencies are allocated to different computing units, the back-to-back path, which is the shortest path, cannot be used, gaps in the non-processing time are generated between instructions, and this substantially increases the computing latency.

Allocation Unit

Figure 6:
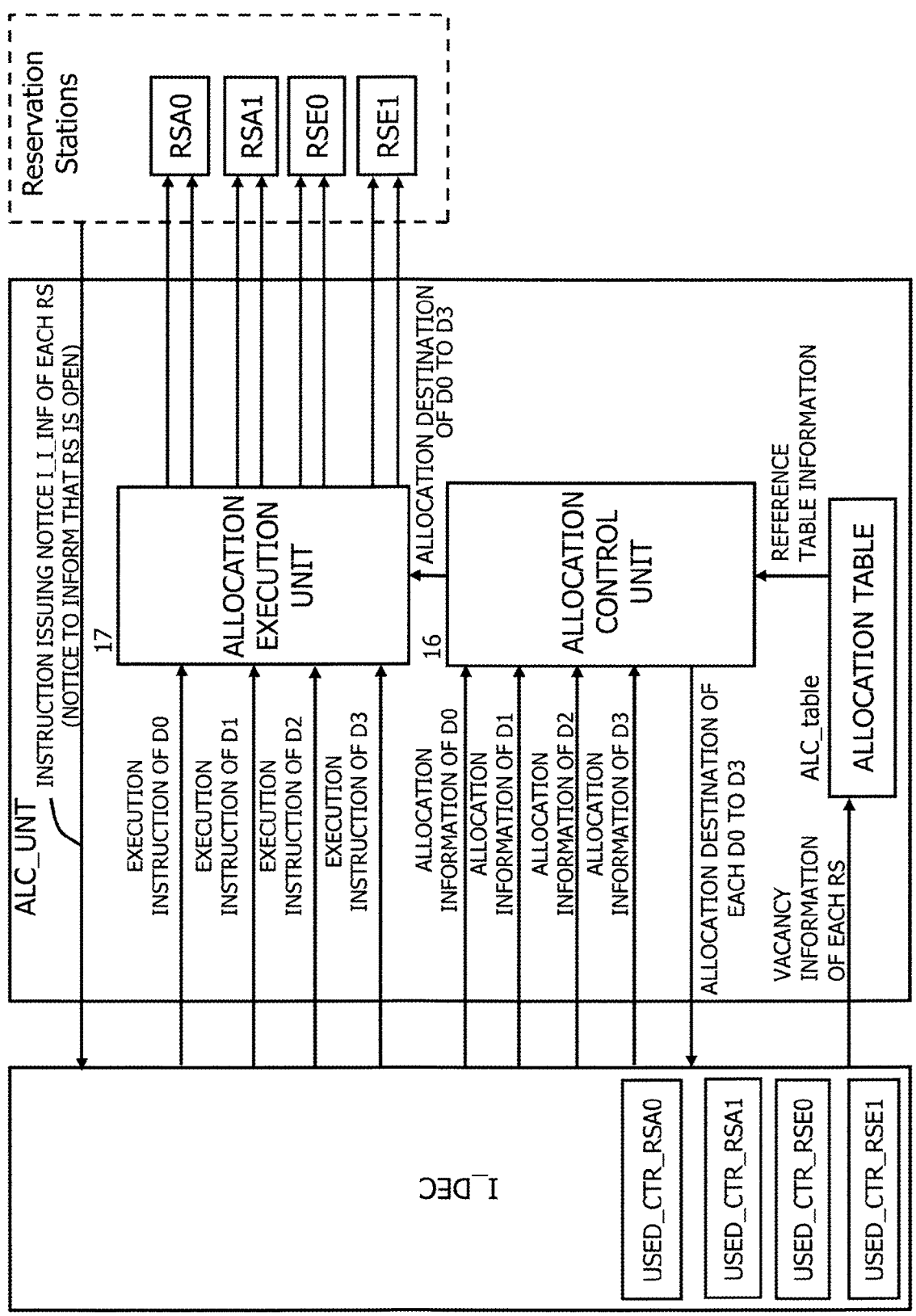
FIG. 6 is a diagram depicting a configuration example of an allocation unit according to Embodiment 1.

FIG. 6 is a diagram depicting a configuration example of an allocation unit according to Embodiment 1. The allocation unit ALC_UNT includes an allocation table ALC table that indicates a reservation station to which an execution instruction outputted from the four slots D0 to D3 of the instruction decoder I_DEC is allocated; an allocation control unit 16 that determines a reservation station to which an execution instruction outputted from each slot D0 to D3 is allocated, with reference to the allocation table; and an allocation execution unit 17 that allocates an execution instruction outputted from each slot D0 to D3 to an allocation destination reservation station, based on the allocation destination information of each slot D0 to D3 determined by the allocation control unit.

The instruction decoder I_DEC determines the RS to which the execution instruction is allocated, in the step of decoding the fetch instruction inputted to each slot D0 to D3. In this determination by the RS, an instruction which is allowed to be allocated to both the fixed-point computing units EXA and EXB is called an "RSE instruction", an instruction which is allowed to be allocated to the operand address generator EAG (EAGA, EAGB) is called an "RSA instruction", and an instruction which is allowed to be allocated to all of EXA, EXB, and EAG is called an "RSX instruction". The RSE instruction is not executed by the computing unit EAGA/EAGB of RSA, and the RSA instruction is not executed by the computing unit EXA/EAB of RSE.

For example, each of the fixed-point computing units EXA and EXB includes an adder/subtracter, a logical computing unit (e.g. AND, OR), a multiplier and the like, whereas each operand address generator EAGA and EAGB includes an adder/subtracter, and a load store unit that accesses the main memory. In this case, it is determined that the AND instruction is an RSE instruction, the LOAD instruction is an RSA instruction, and the ADD instruction is an RSX instruction.

Further, the instruction decoder I_DEC determines whether the fetch instruction has a dependency with the previous instruction of the fetch instruction, in the step of decoding the fetch instruction, and adds a slave flag (SLAVE_FG) to this fetch instruction when the dependency is detected.

Then, as the allocation information, the instruction decoder I_DEC sends the instruction type (RSE instruction, RSA instruction RSX instruction), detected in the step of decoding the fetch instruction in each of slots D0 to D3, and the slave flag SLAVE_FG, which indicates the presence or absence of dependency, to the allocation control unit 16.

The allocation control unit 16 refers to the allocation table based on the allocation information, determines an allocation destination reservation station of the execution instruction in each slot D0 to D3, and sends the determined allocation destination reservation station to the allocation execution unit 17 and the instruction decoder I_DEC. Further, based on the allocation destination information in each slot D0 to D3, the allocation execution unit 17 allocates the execution instruction in each slot D0 to D3 to the allocation destination reservation station RSA0/1, RSE0/1 as a rule in parallel.

When each reservation station issues an execution instruction to a corresponding computing unit, the reservation station notifies with an instruction issuing notice I_I_NTF, which notifies the generation of a vacancy in the input queue, to the instruction decoder I_DEC.

The instruction decoder I_DEC includes a use state counter USED_CTR of the input queue of each reservation station, in order to obtain the vacancy information on the input queue of each RS. These use state counters USED_CTR are provided in each of the four reservation stations (USED_CTR_RSA0, RSA1, RSE0, RSE1). Each of these use state counters is incremented by the number of instructions allocated by the allocation control unit ALC_UNT based on the allocation destination RS information ALC_D_INF of each slot D0 to D3 and is decremented responding to the instruction issuing notice I_I_NTF from RS. By subtracting this count value of the use state counter from the maximum number of entries in the input queue of each RS, the instruction decoder I_DEC recognizes the number of vacancies in the input queue of each RS.

Examples of Allocation Tables

FIG. 7 is a first example of allocation tables. D0 to D3 in the allocation tables indicate the four slots of the instruction decoder. The allocation tables RSE_table_1, RSA_table_1, RSX_table_1, and RSX_table_2 are allocation tables selected depending on whether the execution instruction outputted from each slot D0 to D3 is the RSE instruction, the RSA instruction or the RSX instruction. These allocation tables are basic allocation tables that are used in Embodiment 1.

The allocation destination RS is indicated in cross sections between each slot D0 to D3 and each allocation table names, RSE_table_1, RSA_table_1, RSX_table_1, and RSX_table_2 of the allocation table. The types of the allocation destination RSs are as follows.

RSEm: RS having more vacancies out of RSE0 and RSE1
RSEf: RS having fewer vacancies out of RSE0 and RSE1
RSAm: RS having more vacancies out of RSA0 and RSA1
RSAf: RS having fewer vacancies out of RSA0 and RSA1

The other allocation tables RSE_table_2, RSA_table_2, and RSX_table_3 to RSX_table_6 will be described later in the other embodiments.

FIG. 8 is a second example of allocation tables. These allocation tables have the same configuration as the first example in FIG. 7, except that the arrangement of the allocation destinations in the allocation tables RSEtable_1, RSA_table_1, RSX_table_1, RSX_table_2, RSX_table_3, and RSX_table_4 are different from the first example in FIG. 7. This difference will be described later.

Figure 9:
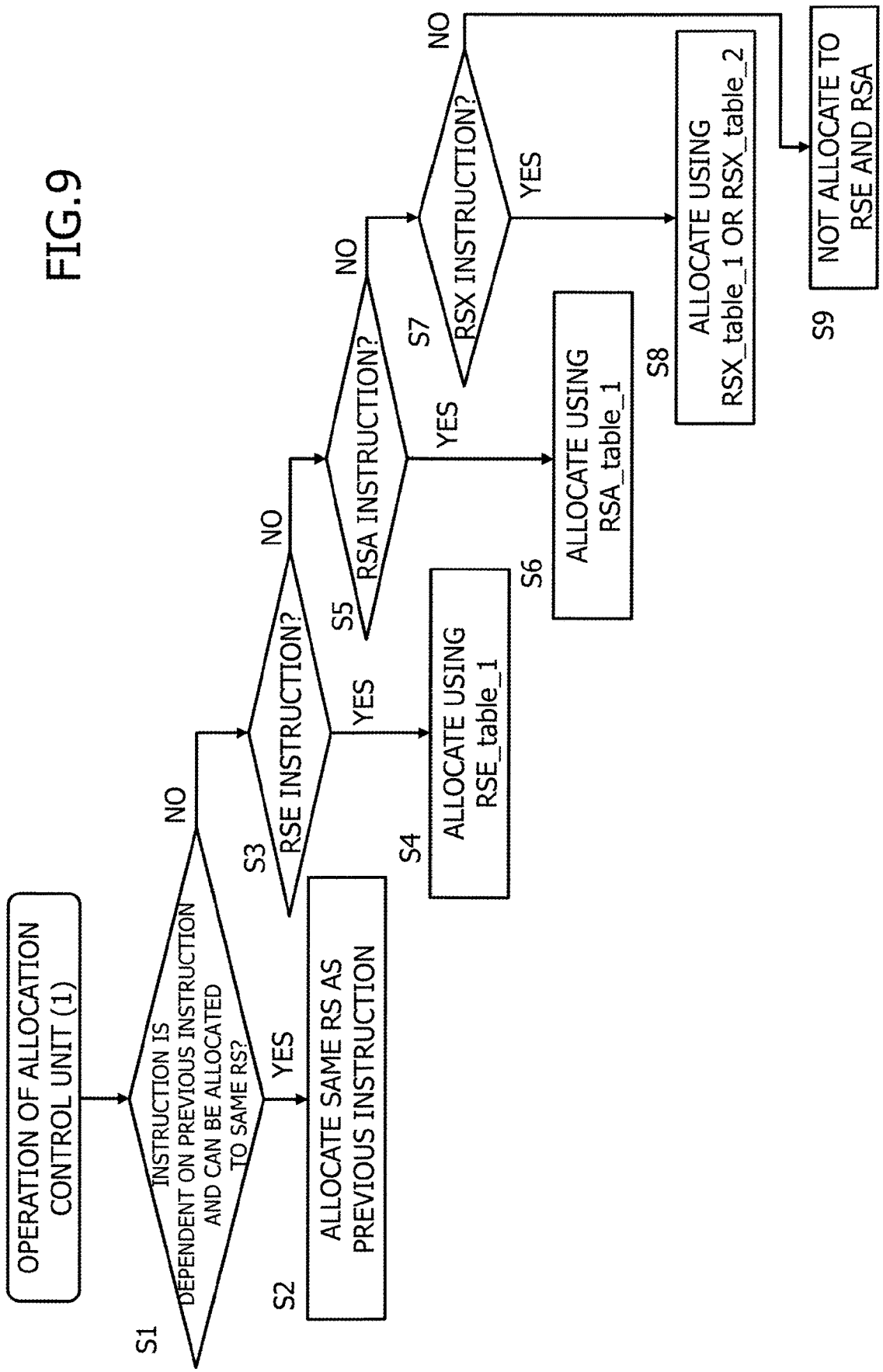
FIG. 9 is a flow chart depicting an operation of the allocation control unit 16 of the allocation unit ALC_UNT according to Embodiment 1.

FIG. 9 is a flow chart depicting an operation of the allocation control unit 16 of the allocation unit ALC_UNT according to Embodiment 1. As mentioned above, as the allocation information of each slot D0 to D3, the instruction decoder I_DEC supplies, to the allocation control unit 16, the instruction type information to indicate whether the execution instruction is an RSE instruction, an RSA instruction or an RSX instruction, and information to indicate whether the slave flag SLAVE_FG is added to the allocation control unit 16.

Then, based on the slave flag, the allocation control unit 16 determines whether the allocation target execution instruction has a dependency with the previous instruction and whether the allocation target execution instruction is allowed to be allocated to the same RS as the previous instruction (S1), and when has a dependency and allowed (YES in S1), the allocation control unit 16 determines that the allocation destination RS of the allocation target execution instruction is the same RS as the previous instruction (S2).

Further, the allocation control unit 16 determines the allocation destination RS as follows.

(1) When the allocation target execution instruction is the RSE instruction (YES in S3), the allocation destination RS is determined based on the allocation table RSE (S4).

(2) When the allocation target execution instruction is the RSA instruction (YES in S5), the allocation destination RS is determined based on the allocation table RSA_table_1 (S6).

(3) When the allocation target execution instruction is the RSX instruction (YES in S7), the allocation destination RS is determined based on the allocation table RSX_table_1 or RSX_table_2 (S8). To determine which one of the allocation tables is used, the total number of vacancies in the reservation stations RSE0 and RSE1 is compared with the total number of vacancies in RSA0 and RSA1, and the allocation table RSX_table_1 is selected when the total number of vacancies is more on the RSE side. When the allocation target execution instruction is not an RSE, RSA, or RSX instruction (NO in S7), the execution instruction is not allocated to RSE and RSA (S9). This type of instruction is a branch instruction or a non-operation (NOP) instruction, for example.

FIG. 10 is an example of allocations of the instructions in each slot D0 to D3 based on the allocation tables. In FIG. 10, the allocation tables RSE_table_1 and RSX_table_1 are shown. Table T1 is a concrete example, which indicates an example of the instruction type outputted from each slot D0 to D3, a reference table that is referred to corresponding to each slot, and the allocation destination RS that is determined based on the reference table.

Feature of RSE Instruction Allocation Table RSE_table_1

In the RSE instruction allocation table RSE_table_1, the allocation destination RS of each slot D0 to D3 is determined as RSEm/RSEf/RSEm/RSEf. This is the first example in FIG. 7. In other words, the allocation destination of the RSE instruction in each slot D0 or D2 is determined as RSEm, and the allocation destination of the RSE instruction in the slot D1 or D3 is determined as RSEf. Here the allocation destinations corresponding to slots D0 to 03 are all RSE. For the allocation destination RSs, the number of RSE0 and of RSE1 are the same, two or less, (the number of input ports of RS is two or less). Furthermore, the sequence of the allocation destination RS of the slots D0 to D3 is RS having more vacancies/RS having fewer vacancies/RS having more vacancies/RS having fewer vacancies, that is, the first sequence (m/f/m/f).

When the instructions are allocated to each RS based on this allocation table, and when the instructions in all the slots D0 to D3 are RSE instructions, then two RSE instructions are allocated to RSEm, and two RSE instructions are allocated to RSEf. In other words, in the case of using this allocation table RSE_table_1, only two instructions at the maximum are simultaneously allocated to RSEm and RSEf respectively.

The number of input ports in each reservation station is two. When the instructions in all the slots D0 to D3 are RSE instructions, therefore, since the number of the slots of the instruction decoder I_DEC is four, whereas the number of input ports in each reservation station is two, thus, the four RSE instructions can be allocated to the reservation stations RSE0 and RSE1 in parallel in one clock cycle.

Out of the four RSE instructions, the RSE instruction in slot D0, of which execution sequence is the earliest in the program, is allocated to RSEm having more vacancies, and the RSE instruction in the slot D3, of which execution sequence is last, is allocated to the RSEf having fewer vacancies. The instructions in slots D1 and D2 are allocated to RSEf having fewer vacancies and RSEm having more vacancies respectively.

This equalizes the number of vacancies between RSE0 and RSE1, and equalizes the number of processing instructions between the computing units EXA and EXB corresponding to RSE0 and RSE1, whereby the utilization efficiency of the plurality of computing units is increased. This is because, among the instructions in the four slots D0 to D3 of the instruction decoder, the instruction in the first slot D0 is assumed to be a branch instruction of which branch destination is not the other slots D1 to D3, in this case, the probability of execution of the instruction decreases as the instruction is located in the later slots. Therefore, in the allocation table RSE_table_1, the allocation destination of the slot D0, of which execution sequence is first, is the RS having more vacancies (RSEm), and the allocation destination of the slot D3, of which execution sequence is later, is the RS having fewer vacancies (RSEf).

The allocation table RSE_table_1 may have allocation destinations in the sequence of RSEm/RSEm/RSEf/RSEf, as in the second example in FIG. 8, to acquire the similar allocation effect as mentioned above.

Feature of RSA Instruction Allocation Table RSA_table_1

Although this is not indicated in FIG. 10, in the RSA instruction allocation table RSA_table_1 of the allocation table examples in FIG. 7, the allocation destinations are RSAm/RSAf/RSAm/RSAf in the sequence of the slots D0 to D3, that is, the allocation destinations are all RSA (two RSAms and two RSAfs), just like the RSE instruction allocation table RSE_table_1. In other words, the allocation destinations of the RSA instructions in the slots D0 and D2 are RSAm, and the allocation destinations of the RSA instructions in the slots D1 and D3 are RSAf. Further, the allocation destinations corresponding to the slots D0 to D3 are all RSA. For the allocation destination RSs, the number of RSA0 and of RSA1 are the same, two or less, (the number of input ports of RS is two or less). Furthermore, the sequence of the allocation destination RS is RS having more vacancies/RS having fewer vacancies/RS having more vacancies/RS having fewer vacancies, that is, the first sequence (m/f/m/f). As a result, the RSA instruction allocation table has the same function as the RSE instruction allocation table.

Feature of RSX Instruction Allocation Table RSX_table_1

Meanwhile, in the RSX instruction allocation table RSX_table_1, the allocation destination RS of each slot D0 to D3 is determined as RSEm/RSEf/RSAm/RSAf. This is also the same as the example in FIG. 7. In other words, the allocation destinations include RSEm, RSEf, RSAm, and RSAf (one each), and the sequence of RSE and RSA is RSE/RSE/RSA/RSA (E/E/A/A) for D0 to D3. Further, just like the RSE instruction table and the RSA instruction table, the sequence of the allocation destination RS is RS having more vacancies/RS having fewer vacancies/RS having more vacancies/RS having fewer vacancies, that is, the first sequence (m/f/m/f). The four allocation destination RSs have the same number of RSE0s, RSE1s, RSA0s, and RSA1s.

According to this allocation table, the allocation destinations of the RSX instructions in the slots D0 and D1 are RSEm and RSEf, and the allocation destinations of the RSX instructions in the slots D1 and D3 are RSAm and RSAf. By allocating like this when all the slots D0 to D3 have RSX instructions, two RSX instructions are allocated to RSE, and two RSX instructions are allocated to RSA.

Therefore in the case of all the slots D0 to D3 having RSX instructions, two RSX instructions, out of the four RSX instructions, are allocated to RSE0 and RSE1, and the other two RSX instructions are allocated to RSAm and RSAf in parallel in one clock cycle.

Further, out of the four RSX instructions, the RSX instruction in the slot D0, of which execution sequence in the program is first, is allocated to RSEm having more vacancies, and the RSX instruction in the slot D3, of which execution sequence in the program is the last, is allocated to RSAf having fewer vacancies. Then for the slots D1 and D2, the RSX instruction in the slot D1 is allocated to RSEf having fewer vacancies, and the RSX instruction in the slot D2 is allocated to RSAm having more vacancies, just like the allocation table RSE_table_1.

As a result, the number of vacancies is equalized among RSE0, RSE1, RSA0, and RSA1, and the number of processing instructions in the computing units EXA and EXB corresponding to RSE0 and RSE1 and those in the computing units EAGA and EAGB corresponding to RSA0 and RSA1 are equalized, whereby the utilization efficiency of the plurality of computing units is improved.

Feature of RSX Instruction Allocation Table RSX_table_2

In the second RSX instruction allocation table RSX_table_2 in FIG. 7, the sequence of RSE and RSA is RSA/RSA/RSE/RSE (A/A/E/E), which is the opposite of the RSX instruction allocation table RSX_table_1. However, the allocation destinations include RSEm, RSEf, RSAm, and RSAf (one each), just like the first RSX instruction allocation table RSX_table_1. Further, just like the RSE instruction table and the RSA instruction table, the sequence of the allocation destination RSs is RS having more vacancies/RS having fewer vacancies/RS having more vacancies/RS having fewer vacancies, that is, the first sequence (m/f/m/f).

As described above, in all of the RSE, RSA, and RSX allocation tables, the maximum number of the same RSs used for the four slots D0 to D3 is two, and the sequence of the RSm having more vacancies, and the RSf having fewer vacancies is the first sequence (m/f/m/f).

In the second allocation tables in FIG. 8, the RSE_table_1 includes two RSEs and two RSAs, but the sequence of the RSm having more vacancies and the RSf having fewer vacancies constitutes the second sequence (m/m/f/f), which is different from FIG. 7. The four allocation destinations RS include RSE0, RSE1, RSA0, and RSA1 in the same number. The m and f sequences in the RSA_table_1, RSX_table_1, and RSX_table_2 also have the second sequence.

In the RSX_table_3 and the RSX_table_4 as well, the sequence of RSs is the first sequence (m/f/m/f) in FIG. 7 and is the second sequence (m/m/f/f) in FIG. 8.

RSE_table_2 and RSA_table_2 in FIG. 7 are the same as RSX_table_5 and RSX_table6 in FIG. 8.

The two types of RSX instruction allocation tables RSX_table_1 and RSX_table_2 in FIG. 7 (FIG. 8) also have the following features. That is, in the RSX instruction allocation tables RSX_table_1 and RSX_table_2, the allocation destination RSs of the first decoder slots D0 and D1 (or D0 and D2) are the allocation destination RSs corresponding to the first decoder slots D0 and D1 (or D0 and D2) in the RSE instruction allocation table RSE_table_1, and the allocation destination RSs of the second decoder slots D2 and D3 (or D1 and D3), which are different from the first decoder slots, are the allocation destination RSs corresponding to the second decoder slots D2 and D3 (or D1 and D3) in the RSA instruction allocation table RSE_table_1, and the sequence of these four allocation destinations RS is the first sequence.

Concrete Example

According to the example of the table T1 in FIG. 10, three or more instructions are not allocated to the same RSEm, RSEf, RSAm, RSAf, regardless the combination of the four instructions in the slots D0 to D3. Further, among the RSs of which instruction type is the same, the number of RSs having more (m) vacancies and the number of RSs having fewer (f) vacancies are the same, and the sequence thereof is that an RS having more vacancies (RSm) is on the earlier slot side, so that the number of instructions in each instruction type is equalized.

In the concrete example of table T1, the instruction types in the slots D0 to D3 are RSE instruction/RSX instruction/RSE instruction/RSX instruction. Thus, the reference table of each slot D0 to D3 is either the RSE instruction allocation table RSE_table_1 or RSX instruction allocation table RSX_ table_1, depending on the instruction type thereof. As a result, the allocation destinations of the instructions in the slots D0 to D3 are RSEm/RSEf/RSEm/RSAf.

According to this result of the allocation destinations, two instructions are allocated to RSEm and one instruction is allocated to RSEf and RSAf respectively. In other words, three or more instructions are not allocated to the same RSEm, RSEf, RSAm, RSAf, two instructions at most are allocated the same RSEm, RSEf, RSAm, RSAf.

In other words, in the configuration of the above improvement (1), the four instructions in the four slots D0 to D3 in the instruction decoder are allocated to the reservation stations, each of which has two input ports, in parallel in the same clock cycle. Thus, throughput of the processing of the instruction decoder does not drop.

FIG. 11 is a comparative example of allocating instructions in each slot D0 to D3 using an unpreferred allocation table. The allocation destinations of the RSE_table_1 are RSEm/RSEf/RSEm/RSEf, which is the same as FIG. 10, but the allocation destinations of the RSX_table_1 are RSAm/RSEm/RSAf/RSEf, which is different from FIG. 10. The unpreferred aspect of the comparative example is that both of these tables do not have the first sequence (m/f/m/f) as in the case of FIG. 7, or both of these tables do not have the second sequence (m/m/f/f) as in the case of FIG. 8.

In the table T2 of the concrete example, the instruction types in the slots D0 to D3 are RSE/RSX/RSE/RSX as in the table T1 in FIG. 10, and the reference table is also the same as T1, but the allocation destination RSs are RSEm/RSEf/RSEm/RSEf, that is, three instructions are allocated to the same RSEm. This makes it difficult to allocate the instructions of the instruction decoder to RSs represented by the RSEm in one cycle.

As understood by the comparative example, according to the embodiment, in the case of RSE_table_1 and RSA_t-able_1, for example, the sequence of the vacancies (m, f) of allocation destinations is both the first sequence (m/f/m/f) in FIG. 7 and the second sequence (m/m/f/f) in FIG. 8.

In the case of RSX_table_1 and RSX_table_2 as well, the sequence of the vacancies (m, f) of the allocation destinations is both the first sequence (m/f/m/f) in FIG. 7 and the second sequence (m/m/f/f) in FIG. 8. Therefore, the sequence of the allocation destinations (RSE or RSA) is (E/E/A/A) and (A/A/E/E) in FIG. 7 and is (E/A/E/A) and (A/E/A/E) in FIG. 8.

As described above, in the allocation tables of RSX, the sequence of RSE and RSA may be (E/E/A/A) and (A/A/E/E), or (E/A/E/A) and (A/E/A/E), as long as both the RSE and RSA tables have the first sequence (m/f/m/f) or the second sequence (m/m/f/f).

Embodiment 2

In Embodiment 2, the execution instructions are allocated using an allocation table, which equalizes the number of allocated instructions between RSE and RSA and equalizes the number of allocated instructions among all of RSE0, RSE1, RSA0, and RSA1 in accordance with the above improvement (2). Therefore, the allocation unit performs the allocation processing using the allocation tables RSE_table_2, RSA_table_2, RSX_table_3, RSX_table_4, RSX_table_5, and RSX_table_6 in addition to the allocation tables RSE_table_1, RSA_table_1, RSX_table_1, and RSX_ table_2 in FIG. 7 or FIG. 8. In the following description, FIG. 7 is used for the allocation processing as an example, but FIG. 8 may be used as an example as well.

Figure 12:
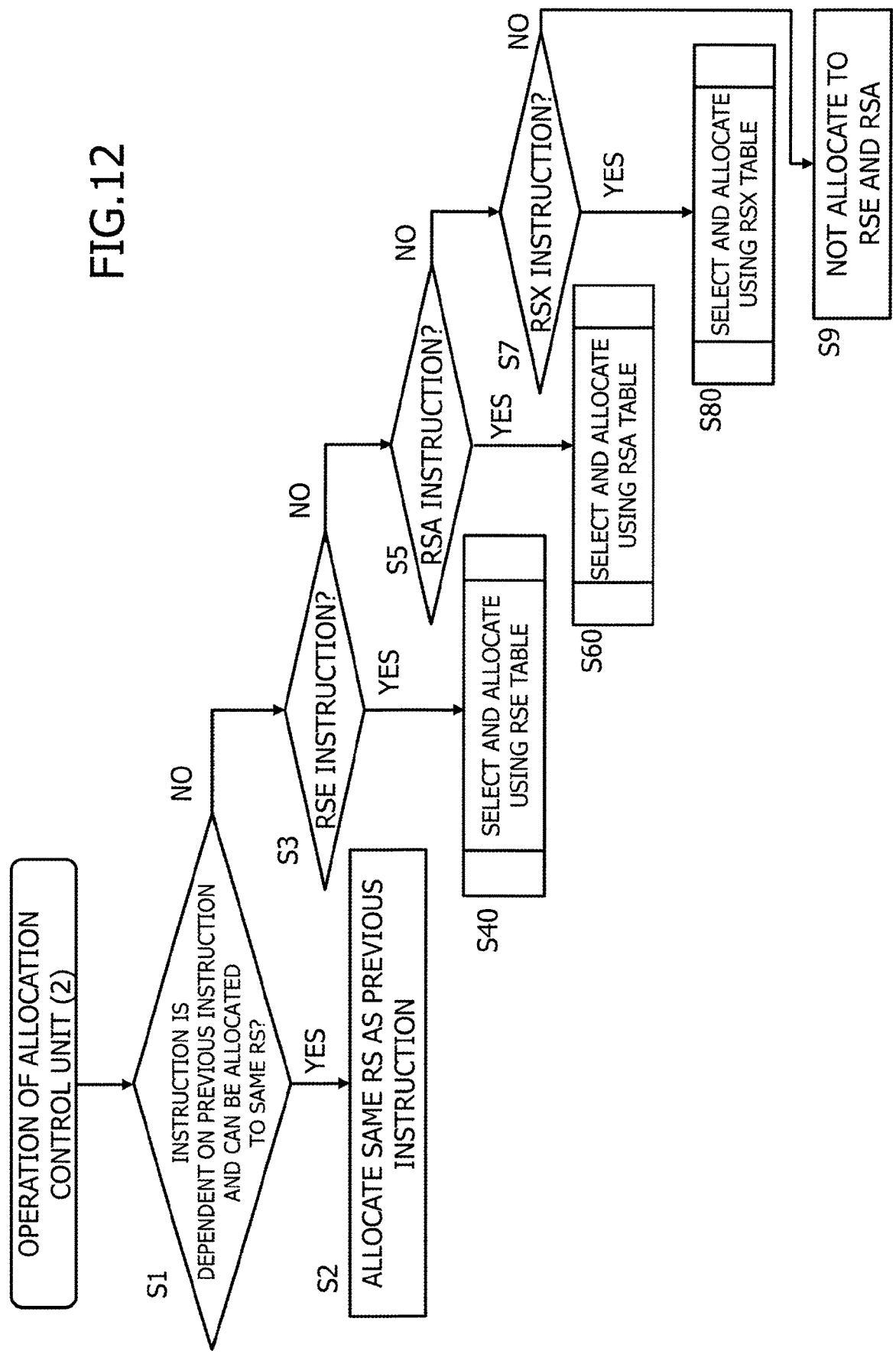
FIG. 12 is a flow chart depicting an operation of the allocation control unit 16 of the allocation unit ALC_UNT according to Embodiment 2.

FIG. 12 is a flow chart depicting an operation of the allocation control unit 16 of the allocation unit ALC_UNT according to Embodiment 2. The allocation control unit 16 determines whether the allocation target execution instruction has a dependency with the previous instruction, and whether the allocation target instruction is allowed to be allocated to the same RS as the previous instruction (S1), and when has the dependency and allowed (YES in S1), the allocation control unit 16 determines that the allocation destination RS of the allocation target execution instruction is the same RS as the previous instruction (S2). The allocation steps thus far are the same as FIG. 9.

The allocation control unit 16 determines the allocation destination RS as follows.

(1) When the allocation target execution instruction is the RSE instruction (YES in S3), the RSE allocation table is selected, and allocation is executed based on this selected table (S40).

(2) When the allocation target execution instruction is the RSA instruction (YES in S5), the RSA allocation table is selected, and allocation is executed based on this selected table (S60).

(3) When the allocation target execution instruction is the RSX instruction (YES in S7), the RSX allocation table is selected, and allocation is executed based on this selected table (S80).

When the allocation target execution instruction is not any one of the RSE, RSA, and RSX instructions (NO in S7), this execution is then not allocated to RSE and RSA (S9).

Figure 13:
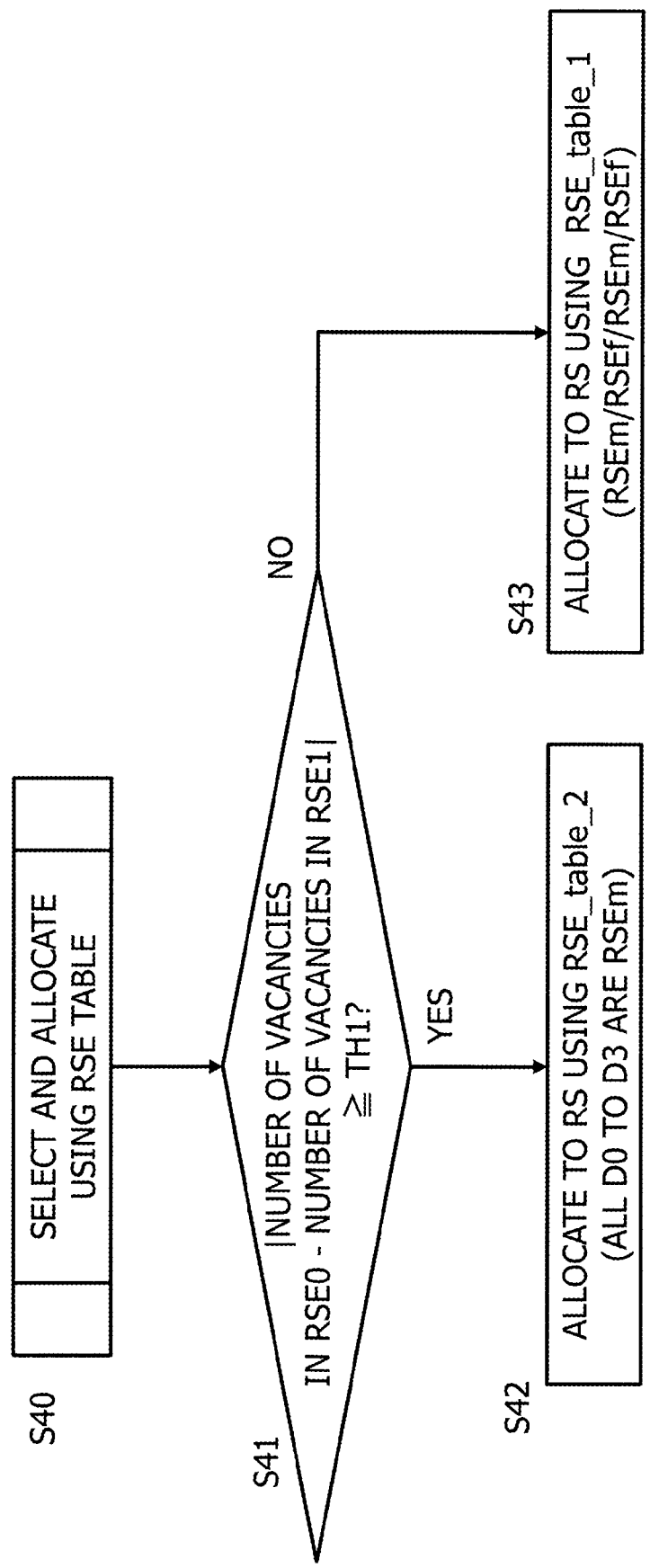
FIG. 13 is a flow chart depicting the processing in S40 (selection of the RSE allocation table and allocation processing based on this selection) in FIG. 12.

FIG. 13 is a flow chart depicting the processing in S40 (selection of the RSE allocation table and allocation processing based on this selection) in FIG. 12. In the case of the RSE instruction, when the difference of the number of vacancies between RSE0 and RSE1 is equal to or more than a first threshold TH1 (YES in S41), the allocation control unit 16 selects the RSE_table_2 which allocates the instructions in all the slots D0 to D3 to RSEm, and allocates the RSE instruction based on this table (S42). When the difference is less than the first threshold TH1 (NO in S41), the allocation control unit 16 selects the basic allocation table RSE_table_1, just like Embodiment 1, and allocates the RSE instruction based on this table (S43). By selecting RSE_table_2 or RSE_table_1, depending on whether the difference of the number of vacancies between RSE0 and RSE1 is large or not, and using the selected table, the number of vacancies in RSE0 and those in RSE1 are equalized as much as possible.

Figure 14:
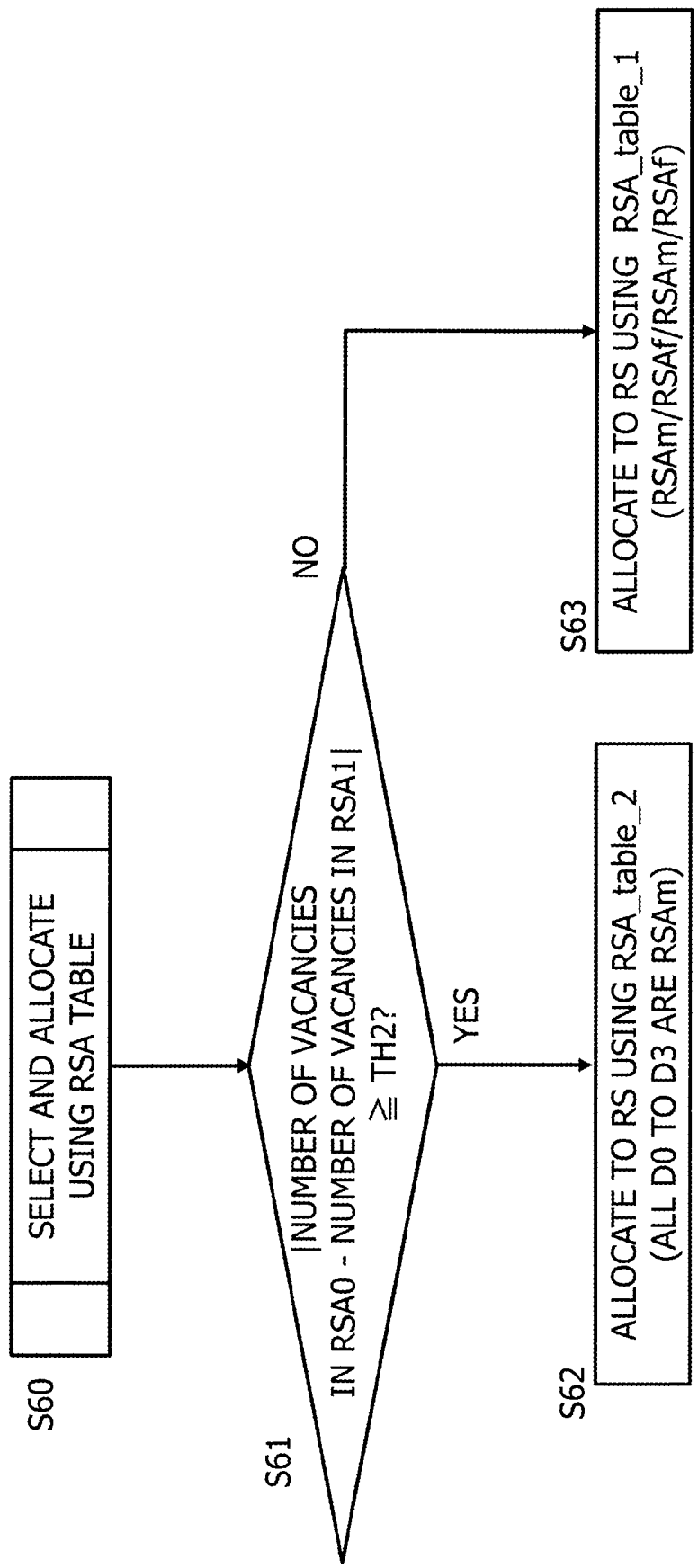
FIG. 14 is a flow chart depicting the processing in S60 (selection of the RSA allocation table, and allocation processing based on this selection) in FIG. 12.

FIG. 14 is a flow chart depicting the processing in S60 (selection of the RSA allocation table, and allocation processing based on this selection) in FIG. 12. In the case of the RSA instruction, when the difference of the number of vacancies between RSA0 and RSA1 is equal to or more than a second threshold TH2 (YES in S61), the allocation control unit 16 selects the RSA_table_2 which allocates the instructions in all the slots D0 to D3 to RSAm, and allocates the RSA instruction based on this table (S62). When the difference is less than the second threshold TH2 (NO in S61), the allocation control unit 16 selects the basic allocation table RSA_table_1, just like Embodiment 1, and allocates the RSA instruction based on this table (S63). By selecting RSA_table_2 or RSA_table_1, depending on whether the difference of the number of vacancies between RSA0 and RSA1 is large or not, and using the selected table, just like the case of RSE in FIG. 13, the number of vacancies in RSA0 and those in RSA1 are equalized as much as possible.

Figure 15:
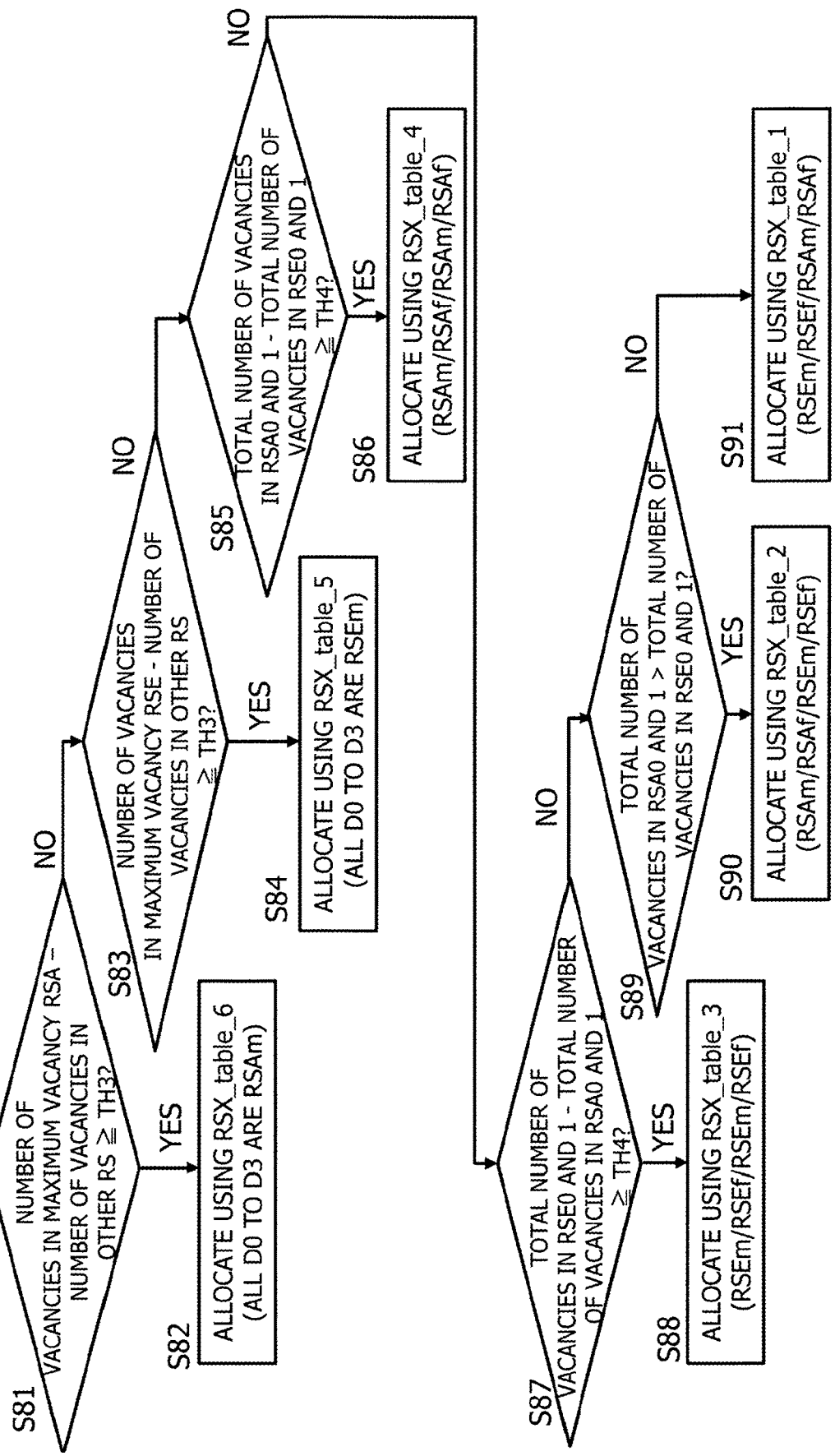
FIG. 15 is a flow chart depicting the processing in S80 (selection of the RSX allocation table, and allocation processing based on this selection) in FIG. 12.

FIG. 15 is a flow chart depicting the processing in S80 (selection of the RSX allocation table, and allocation processing based on this selection) in FIG. 12. When the difference of a maximum number of vacancies of RSA and the number of vacancies of the other RSs is equal to or more than a third threshold TH3 (YES in S81), the allocation control unit 16 selects the RSX_table_6 which allocates the instructions in all the slots D0 to D3 to RSAm, and allocates the RSX instruction based on this table (S82). When the difference between the maximum number of vacancies of RSE and the number of vacancies of the other RSs is equal to or more than the third threshold TH3 (YES in S83), the allocation control unit 16 selects the RSX_table_5 which allocates the instructions in all the slots D0 to D3 to RSEm, and allocates the RSX instruction based on this table (S84).

When the total number of vacancies of RSA0 and RAS1 is more than the total number of vacancies of RSE0 and RSE1 by at least a fourth threshold TH4 (YES in S85), the allocation control unit 16 selects the RSX_table_4 in which the sequence of RSA is RSAm/RSAf/RSAm/RSAf, which are aligned according to the first sequence (m/f/m/f), and allocates the RSX instruction based on this table (S86). On the contrary, when the total number of vacancies of RSE0 and RSE1 is more than the total number of vacancies of RSA0 and RSA1 by at least the fourth threshold TH4 (YES in S87), then the allocation control unit 16 selects the RSX_table_3 in which the sequence of RSE is RSEm/RSEf/RSEm/RSEf, which are aligned according to the first sequence (m/f/m/f), and allocates the RSX instruction based on this table (S88).

Finally, when the total number of vacancies of RSA0 and RSA1 is more than the total number of vacancies of RSE0 and RSE1 (YES in S89), just like step S8 in FIG. 9 of Embodiment 1, the allocation control unit 16 allocates based on the RSX_table_2 (S90), and when not (NO in S89), the allocation control unit 16 allocates based on the RSX_table_1 is used for the allocation (S91).

By selecting the allocation table depending on the relationship of the number of vacancies, as mentioned above, the number of instructions allocated in RSE, RSA, and between RSE and RSA and among all RSs are equalized. In the case of selecting RSE_table_2, RSA_table_2, RSX_table_5, and RSX_table_6, however, the four allocation destinations become the same RS. Thus, in this case, the instruction decoder allocates the instructions to the same RS in two clock cycles. It may be determined whether these tables are selected or not depending on whether the focus is placed on throughput based on the instruction allocation by the instruction decoder, or throughput based on equalizing the number of processing times by all computing units.

As indicated in FIG. 6, information on the number of vacancies based on the counter values of RSA0, RSA1, RSE0, and RSE1 are supplied from the instruction decoder I_DEC to the allocation table ALC_table in the allocation unit. Thus, an optimum table in the allocation table ALC_table is selected based on FIG. 12 to FIG. 15, and the selected reference table information is supplied to the allocation control unit 16. The allocation control unit 16 may execute selection of the optimum table.

Embodiment 3

Figure 16:
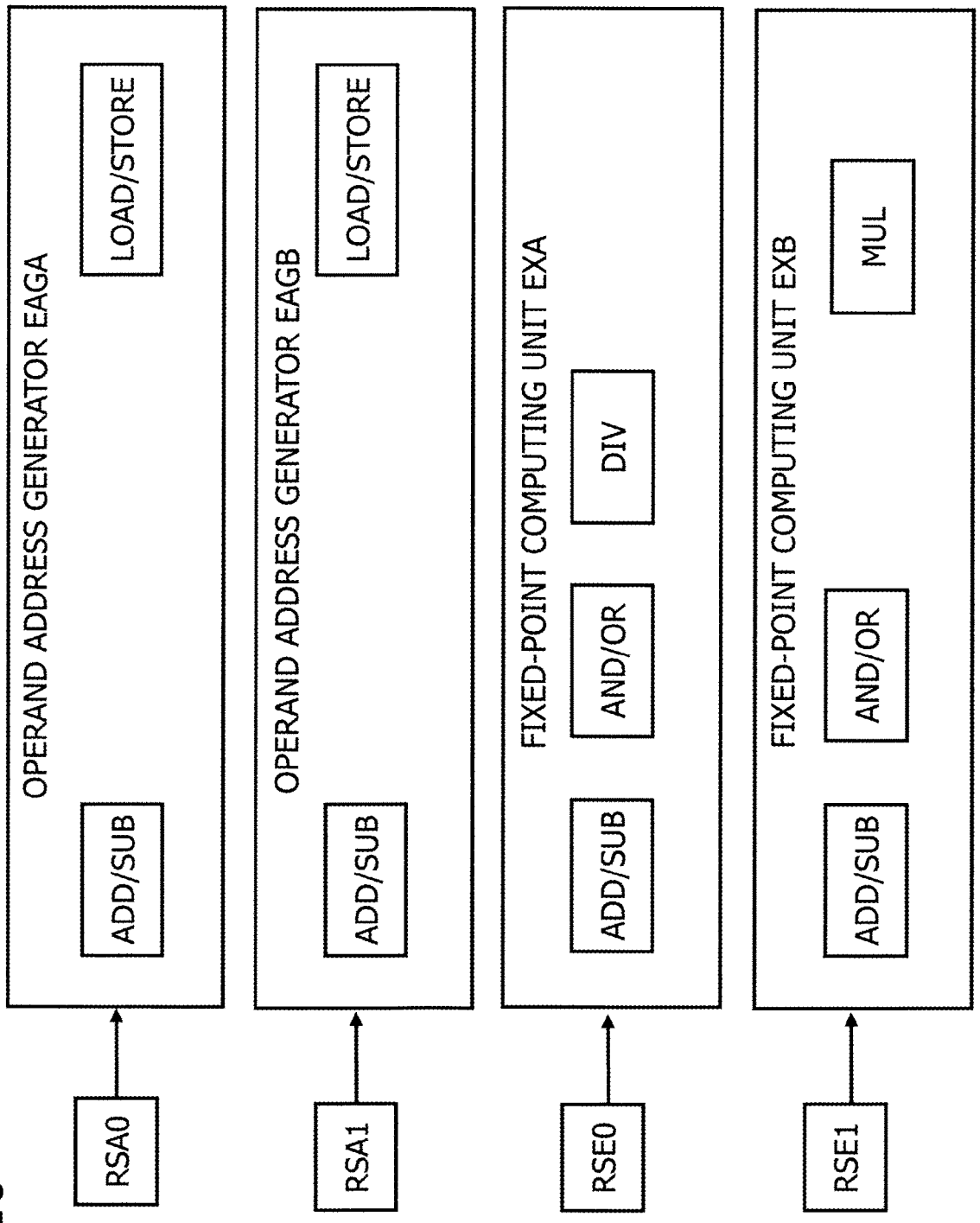
FIG. 16 is a diagram depicting configuration examples of four computing units according to Embodiment 3.

FIG. 16 is a diagram depicting configuration examples of four computing units according to Embodiment 3. In the configuration examples in FIG. 16, each operand address generator EAGA and EAGB includes an adder/subtracter ADD/SUB, and a load/store unit LOAD/STORE. A first fixed-point computing unit EXA includes an adder/subtracter ADD/SUB, a logic computing unit AND/OR, and a divider DIV. A second fixed-point computing unit EXB includes an adder/subtracter ADD/SUB, a logic computing unit AND/OR, and a multiplier MUL. The divider DIV or the multiplier MUL, of which circuit mounting cost is high and frequency use is low, is disposed only in one of the fixed-point computing units.

In the case of the above configurations of the four computing units, the instruction decoder distinguishes between an RSE0 instruction which is executed only by the RSE0 computing unit (e.g. division instruction), an RSE1 instruction which is executed only by the RSE1 computing unit (e.g. multiplication instruction), and an RSE instruction which is executed by both the RSE0 and RSE1 computing units. When the instruction decoder determines that the instruction is the RSE0 instruction, the allocation control unit of the allocation unit determines that the allocation destination is RSE0, without using the allocation table or allocation based on dependency. When the instruction decoder determines that the instruction is the RSE1 instruction, the allocation control unit determines that the allocation destination is RSE1, without using the allocation table or allocation based on dependency.

Figure 17:
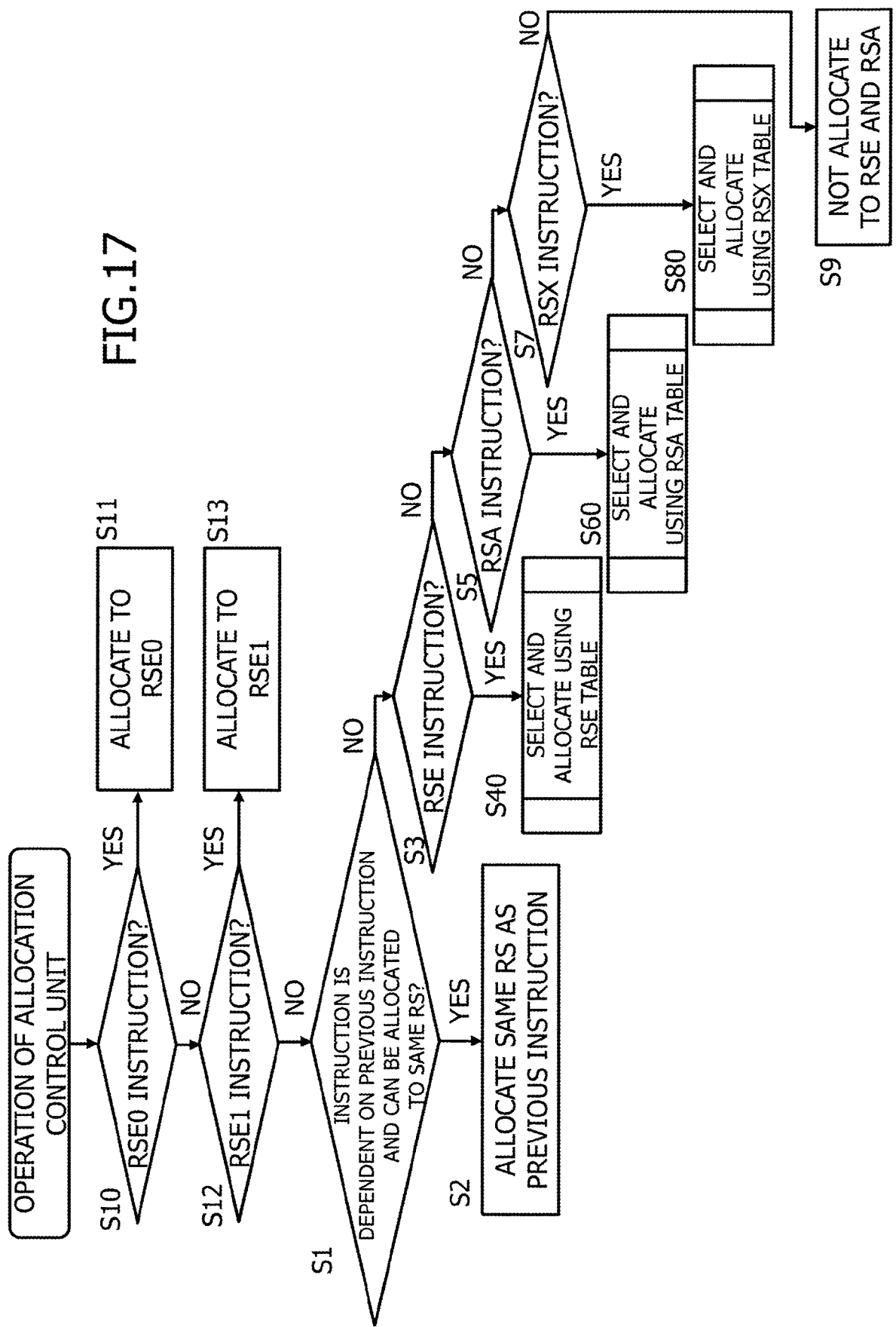
FIG. 17 is a flow chart depicting the operation of the allocation control unit according to Embodiment 3.

FIG. 17 is a flow chart depicting the operation of the allocation control unit according to Embodiment 3. In FIG. 17, the steps S10 to S13 are added to the flow chart in FIG. 12. In other words, when the execution instruction generated by the instruction decoder is the RSE0 instruction (YES in S10), the allocation control unit allocates this instruction to RSE0 (S11), and when the execution instruction is the RSE1 instruction (YES in S12), the allocation control unit allocates this instruction to RSE1 (S13). The rest is the same as FIG. 12.

Embodiment 4

Figure 18:
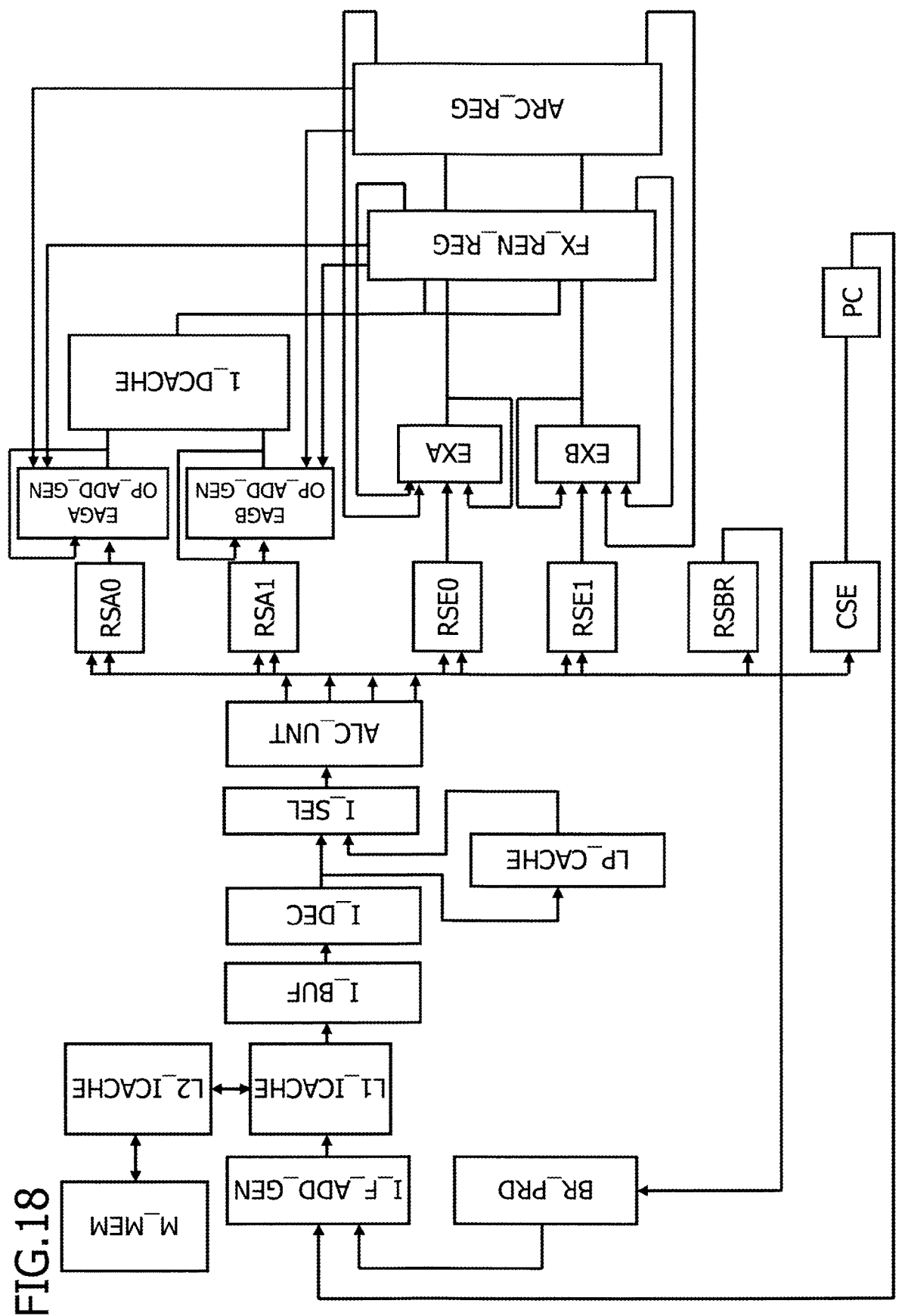
FIG. 18 is a diagram depicting a configuration example of the processor according to Embodiment 4.

FIG. 18 is a diagram depicting a configuration example of the processor according to Embodiment 4. A difference in the configuration of FIG. 18 from that of FIG. 2 is that a loop cache LP_CACHE and an instruction selector I_SEL are disposed between the instruction decoder I_DEC and the allocation unit ALC_UNT. The instruction decoder I_DEC includes four slots D0 to D3 (not illustrated), just like FIG. 2.

When a loop is detected in a string of instructions arranged in the execution sequence in the program, the loop cache registers (records) one loop of execution instructions which the instruction decoder I_DEC outputs. Then, hereafter, not the instruction decoder but the loop cache outputs the execution instructions in one loop. The instruction selector I_SEL selects an execution instruction on the loop cache side, and outputs the instruction to the allocation unit ALC_UNT. While the loop cache repeats output of the execution instructions in one loop, the operation of the instruction fetch address generator I_F_ADD_GEN, the L1 instruction cache L1_ICACHE, the instruction buffer I_BUF, and the instruction decoder I_DEC are stopped to conserve power. However, management of the number of entries in each RS by the instruction decoder, using the counter in RS continues. While the execution instructions are being outputted from the loop cache, the allocation execution unit 17 in the allocation unit allocates each execution instruction outputted from the loop cache to RS based on the allocation table.

In FIG. 9, FIG. 12, and FIG. 17 of Embodiment 1, etc., when the instruction decoder detects that the inputted fetch instruction is an instruction which depends on the previous instruction, a slave flag SLAVE_FG is added to the execution instruction corresponding to the fetch instruction. Then, when possible the allocation unit allocates the execution instruction with the slave flag to the RS, that is, the same as the RS to which the previous instruction is allocated. Thereby the computing cycle can be shortened using the back-to-back path disposed in the computing unit.

However, when the execution instruction, of which dependency on the previous instruction was detected, is the RSE0 instruction, the previous execution instruction is allocated to RS based on the allocation table. Thus, the previous instruction is not necessarily allocated to the same RSE0. In this way, in the case of the method of adding the slave flag, the instruction on which dependency is detected is not always allocated to the same RS, and in such a case, the execution cycle of the computing unit may not be shortened.

Meanwhile, all the execution instructions in one loop are registered in the loop cache, as illustrated in FIG. 18. Thus, an instruction string having a dependency (hereinafter, referred to as a "chain instruction string") can be detected in the instruction strings registered in the loop cache.

Therefore in Embodiment 4, the allocation unit detects a chain instruction string in the execution instruction string registered in the loop cache, and allocates a chain ID, which is incremented every time a chain instruction string is detected, to the instructions of the detected chain instruction string. This chain ID is registered in the loop cache. Then, based on the instruction types in the chain instruction string, the allocation unit selects an RS to which each instruction in the chain instruction string is allocated, based on a chain table (described later).

Figure 19:
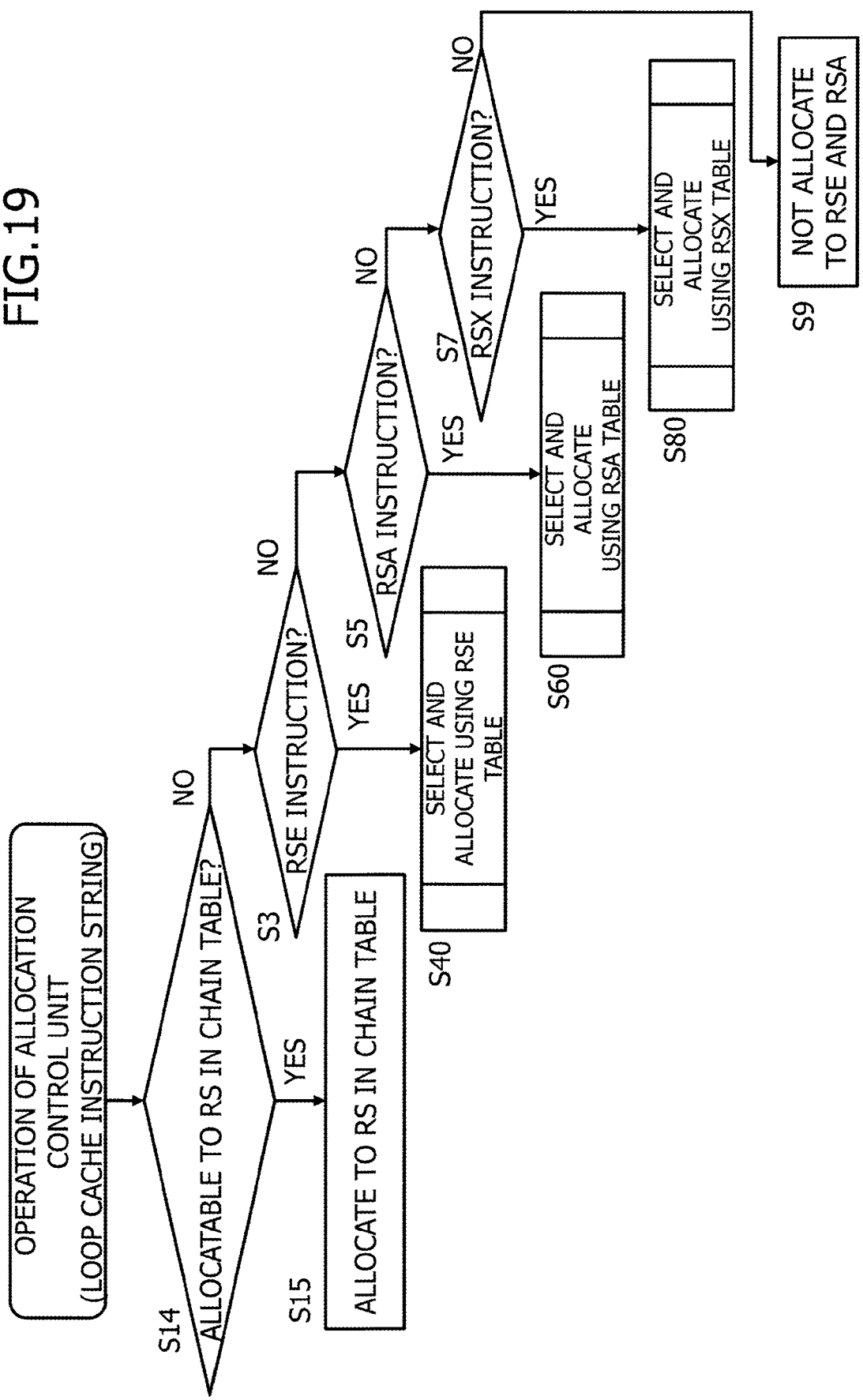
FIG. 19 is a flow chart depicting an operation of the allocation control unit of the allocation unit according to Embodiment 4.

FIG. 19 is a flow chart depicting an operation of the allocation control unit of the allocation unit according to Embodiment 4. For an execution instruction to which a chain ID, instead of a slave flag which is added to an execution instruction having a dependency, is added, the allocation control unit determines whether this execution instruction is allowed to be allocated to an allocation destination RS indicated in the chain table (FIG. 21) (S14). When allocation to the RS indicated in the chain table is allowed, allocation control unit controls to allocate the execution instruction with the chain ID (chain instruction string) to the allocation destination RS indicated in the chain table (S15).

FIG. 20 is a table indicating the chain IDs and the chain table IDs corresponding to examples of the instruction strings registered in the loop cache. Here it is assumed that sixteen instructions are registered in the loop cache. Out of these instructions, it is assumed that the instructions of the instruction numbers 1 to 4 and 7 to 12 are chain instruction strings of which instructions have a dependency individually.

In this case, the loop cache or the allocation unit examines the instruction string in the loop cache and allocates the chain ID "0" to the chain instruction string of the instruction numbers 1 to 4 and allocates the chain ID "1" to the chain instruction string of the instruction numbers 7 to 12. The chain IDs are registered in the loop cache.

FIG. 21 is an example of a chain table. The chain table ID is constituted of three bits, which indicate the RSE0 instruction, the RSE1 instruction and the RSA instruction included in the chain instruction string of each chain ID. Therefore, there are eight types of chain table IDs [000] to [111]. The chain table does not depend on RSX instruction.

FIG. 22 is a table indicating the correspondence between the presence of the RSE instruction, the RSE0 instruction, and the RSE1 instruction in the chain instruction string; and the fields of RSE0 and RSE1 among the three bits of RSE0, RSE1 and RSA of the chain table ID in FIG. 21. The RSE instruction is an instruction that can be executed in both RSE0 and RSE1. In the table in FIG. 22, the three columns to the left indicate whether the RSE instruction, the RSE0 instruction and the RSE1 instruction are included in the chain instruction string, and the two columns to the right indicate the values of the fields of RSE0 and RSE1, which indicate the allocation destination RS, included in the chain table in FIG. 21.

For example, in the case where the chain instruction string includes the RSE instruction and the RSE0 instruction and does not include the RSE1 instruction (RSE=1, RSE0=1, RSE1=0) in the three columns to the left, the two columns to the right indicate RSE0=1 and RSE1=0. The RSE instruction in the three columns to the left may be either the RSE0 instruction or the RSE1 instruction. Thus, in the two columns to the right, RSE0=1 and RSE1=0 are indicated based on RSE0=1. In the case where the chain instruction string includes the RSE0 instruction and does not include the RSE1 instruction and the RSE instruction, (RSE=0, RSE0=1, RSE1=0) as well, and the two columns to the right indicate RSE0=1 and RSE1=0. When the RSE0 instruction and the RSE1 instruction in the three columns to the left are replaced, the two columns to the right is similarly RSE0=0 and RSE1=1.

Further, in the case where the chain instruction string does not include the RSE instruction and does include the RSE0 instruction and the RSE1 instruction (RSE=0, RSE0=1, RSE1=1) in the three columns to the left, the two columns to the right indicate RSE0=1 and RSE1=1. In the case where the chain instruction string includes the RSE instruction and also includes the RSE0 instruction and the RSE1 instruction (RSE=1, RSE0=1, RSE1=1) as well, the two columns to the right indicate RSE0=1 and RSE1=1.

Further, in the case where the chain instruction string includes the RSE instruction and does not include the RSE0 instruction and the RSE1 instruction (RSE=1, RSE0=0, RSE1=0) in the three columns to the left, as well, the two columns to the right indicate RSE0=1 and RSE1=1.

For the RSA instruction, the RSA in the chain table simply becomes RSA=1 in the case where the chain instruction string includes the RSA instruction (not indicated in FIG. 22).

In the case of the chain table ID=[000] in FIG. 21, the instructions in the chain instruction string are all RSX instructions. This means that the instructions in the chain instruction string may be allocated to any one of four instructions RSE0, RSE1, RSA0, and RSA1 for computing. Thus, the instructions in the chain instruction string are allocated to RSA0 if the remainder, when the number of the chain ID is divided by 4, is 0, to RSA1 if this remainder is 1, to RSE0 if this remainder is 2, and to RSE1 if this remainder is 3. In this case, the allocation destinations of the instructions having a same chain ID (the instructions in the same chain instruction string) are fixed to the same RS.

Thus, the processing by the computing unit at the allocation destination RS can be repeated at a shortest cycle using the back-to-back path.

In the case of the chain table ID=[001], the chain instruction string has the RSX instruction and the RSA instruction. Thus, the instructions in the chain instruction string may be allocated to either one of two instructions RSA0 and RSA1 for computing. Therefore, the instructions in the chain instruction string are allocated to RSA0 if the remainder of dividing the number of the chain ID by 2 is 0, and to RSA1 if this remainder is 1. In this case, the allocation destinations of the instructions having the same chain ID (the instructions in the same chain instruction string) are fixed to either RSA0 or RSA1.

In the case of the chain table ID=[010], the chain instruction string has the RSX instruction, the RSE instruction and the RSE1 instruction (or the RSX instruction and the RSE1 instruction). Thus, the instructions in the chain instruction string are allocated to RSE1. In this case, the allocation destinations of the instructions having the same chain ID (the instructions in the same chain instruction string) are fixed to RSE1.

In the same manner, in the case of the chain table ID=[100], the chain instruction string has the RSX instruction, the RSE instruction and the RSE0 instruction (or the RSX instruction and the RSE0 instruction). Thus, the instructions in the chain instruction string are allocated to RSE0. In this case, the allocation destinations of the instructions having the same chain ID (the instructions in the same chain instruction string) are fixed to RSE0.

In the case of the chain table ID=[011], the chain instruction string has the RSX instruction, the RSA instruction, the RSE instruction and the RSE1 instruction (or the RSX instruction, the RSA instruction and the RSE1 instruction). When the allocation destination is fixed to RSE1 here, the computing processing by the computing unit in a shortest cycle may be interrupted by the load/store processing of the RSA instruction. Thus, the instructions in the chain instruction string are allocated to RSE1. In this case, the allocation destinations of the instructions having the same chain ID (the instructions in the same chain instruction string) are fixed to RSE1. However, as an exception, the RSA instruction is allocated to RSA. In other words, the computing processing of the computing unit of RSE1 can be shortened except in the case where the computing processing by the computing unit of RSE1 in a shortest cycle is interrupted by the RSA instruction.

In the same manner, in the case of the chain table ID=[101], the chain instruction string has the RSX instruction, the RSA instruction, the RSE instruction and the RSE0 instruction (or the RSX instruction, the RSA instruction and the RSE0 instruction). The instructions in the chain instruction string are allocated to RSE0 for the same reason as the above case of the chain table ID=[011]. In this case, the allocation destinations of the instructions having the same ID (the instructions in the same chain instruction string) are fixed to RSE0. However, as an exception, the RSA instruction is allocated to RSA. In other words, the computing processing of the computing unit of RSE0 can be shortened except in the case where the computing processing by the computing unit of RSE0 in the shortest cycle is interrupted by the RSA instruction.

In the case of the chain table ID=[110], the chain instruction string has the RSX instruction, the RSE instruction, the RSE1 instruction and the RSE0 instruction (or the RSX instruction, the RSE1 instruction and the RSE0 instruction). In this case, the instructions in the chain instruction string may be allocated to either one of two instructions RSE1 or RSE0 for computing.

Therefore the instructions are allocated to RSE0 if the remainder of dividing the number of the chain ID by 2 is 0, and to RSE1 if this remainder is 1. In this case, the allocation destinations of the instructions having the same chain ID (the instructions in the same chain instruction string) are fixed to either RSE0 or RSE1. However, as an exception, the RSE0 instruction is always allocated to RSE0, and the RSE1 instruction is always allocated to RSE1. Since the allocation destinations of the instructions in the same chain instruction string are fixed to either one of RSE0 and RSE1, the computing processing by the computing unit of the fixed RS in the shortest cycle is expected.

In the case of the chain table ID=[111], the chain instruction string has the RSX instruction, the RSE instruction, the RSE1 instruction, the RSE0 instruction and the RSA instruction (or the RSX instruction, the RSE1 instruction, the RSE0 instruction and the RSA instruction). In this case, the instructions in the chain instruction string may be allocated to either one of two RS, RSE1 and RSE0, for computing. When the allocation destination is fixed to RSA, the shortest cycle processing times by the computing unit may be interrupted.

Therefore the instructions are allocated to RSE0 if the remainder of dividing the number of the chain ID by 2 is 0, and to RSE1 if this remainder is 1. In this case, the allocation destinations of the instructions having the same chain ID (the instructions in the same chain instruction string) are fixed to either RSE0 or RSE1. However, as an exception, the RSE0 instruction is always allocated to RSE0, and the RSE1 instruction is always allocated to RSE1. In the same manner, as an exception, the RSA instruction is always allocated to either RSA0 or RSA1. Since the allocation destinations of the instructions in the same chain instruction string are fixed to either RSE0 or RSE1, the computing processing by the computing unit of the fixed RS in the shortest cycle is expected.

According to Embodiment 4, all the instruction strings in one loop are registered in the loop cache. Thus, the chain instruction strings having dependencies are detected by analyzing the instruction strings. Then the chain table, which is classified into three bits of the RSE0 instruction, the RSE1 instruction and the RSA instruction in the chain instruction string, is searched, and the instructions in the chain instruction string are allocated to the allocation destinations RS indicated in the chain table. Thereby the allocation destinations of the instructions in the chain instruction string are fixed to the allocation destination RS indicated in the chain table, and the computing processing in the shortest cycle by the computing unit of RS at the fixed allocation destination can be more efficiently used.

According to the first aspect, a drop in the throughput of the processor may be prevented.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing unit comprising:
an instruction decoder configured to decode fetch instructions, which are fetched in in-order execution according to a program, and to generate execution instructions;
first to fourth reservation stations, each of the reservation stations including an input port and an instruction queue that queues the execution instructions via the input port;
first and second computing units, first and second computing units exclusively including the first and second reservation stations, respectively, and exclusively executing the execution instructions queued in the first and second reservation stations, respectively,
first and second load-store units, the first and second load-store units exclusively including the third and fourth reservation stations, respectively, and exclusively executing the execution instructions queued in the third and fourth reservation stations, respectively;
a loop cache configured to temporarily store an in-loop execution instruction string having execution instructions in a loop generated by the instruction decoder;
an allocation unit configured to allocate the execution instructions generated by the instruction decoder, or execution instructions in the in-loop execution instruction string stored in the loop cache to one of the first to fourth reservation stations; and
a general register file configured to store execution results of the first and second computing units and execution results of the first and second load-store units, wherein
each of the first and second computing units includes a bypass route that supplies the execution result to an own input in each of the first and second computing units without using the general register file and does not include a bypass route that supplies the execution result to the other computing units without using the general register file,
each of the first and second load-store units includes a bypass route that supplies the execution result to an own input of each of the first and second load-store units without using the general register file and does not include a bypass route that supplies the execution result to the other load-store unit without using the general register file, wherein, in the allocation unit,
when the in-loop instruction strings in the loop cache includes a chain instruction string having a plurality of continuous execution instructions having a dependency such that a computing result of the previous execution instruction is used for the computing of a subsequent execution instruction,
and when the chain instruction string includes a first execution instruction that is executable by the first computing unit but not executable by the first and second load-store units and does not include a second execution instruction that is not executable by the first computing unit but is executable by any one of the second computing unit, the first load-store unit, and the second load-store unit, the allocation unit allocates the execution instruction in the chain instruction string to the first reservation station.

2. The arithmetic processing unit according to claim 1, wherein,
when the chain instruction string includes a third execution instruction that is executable by the first load-store unit or the second load-store unit but not executable by the first computing unit and the second computing unit, and does not include a fourth execution instruction that is not executable by the first load-store unit and the second load-store unit but is executable by either one of the first computing unit and the second computing unit, the allocation unit allocates the execution instruction in the chain instruction string to the third reservation station or the fourth reservation station.

3. The arithmetic processing unit according to claim 1, wherein,
when the chain instruction string includes only general execution instructions that are executable by any one of the first and second computing units and the first and second load-store units, the allocation unit allocates the execution instructions in the chain instruction string to any one reservation station of the first to fourth reservation stations by rotation.

* * * * *